United States Patent
Matsumoto

(10) Patent No.: US 8,135,049 B2
(45) Date of Patent: Mar. 13, 2012

(54) OPTICAL PULSE GENERATING APPARATUS USING PHOTOELECTRIC EFFECT OF SURFACE PLASMON RESONANCE PHOTONS AND ITS MANUFACTURING METHOD

(75) Inventor: Takahiro Matsumoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 410 days.

(21) Appl. No.: 12/502,343

(22) Filed: Jul. 14, 2009

(65) Prior Publication Data
US 2010/0014546 A1    Jan. 21, 2010

(30) Foreign Application Priority Data
Jul. 15, 2008    (JP) .................................. 2008-183433

(51) Int. Cl.
*H01S 3/10* (2006.01)
*H01S 5/00* (2006.01)

(52) U.S. Cl. ............ 372/25; 372/26; 372/30; 372/49.01

(58) Field of Classification Search ............... 372/25, 372/26, 30, 49.01, 53, 70
See application file for complete search history.

(56) References Cited

FOREIGN PATENT DOCUMENTS
JP   2003-500861 A   1/2003
WO   WO 00/72412 A1   11/2000

OTHER PUBLICATIONS

H. Raether; Springer Tracts in Modern Physics; Surface Plasmons on Smooth and Rough Surfaces and on Gratings; vol. 111; pp. 16-19, 1988.

*Primary Examiner* — Armando Rodriguez
(74) *Attorney, Agent, or Firm* — Holtz, Holtz, Goodman & Chick, PC

(57) ABSTRACT

In an optical pulse generating apparatus including a metal layer having an incident/reflective surface adapted to receive incident light and output its reflective light as an optical pulse signal, a dielectric layer formed on an opposite surface of the metal layer opposing the incident/reflective surface, and a dielectric layer exciting unit for exciting the dielectric layer on a time basis, the incident light exciting surface plasmon resonance light in the metal layer while the dielectric layer is excited on a time basis, so that an extinction coefficient of the dielectric layer is made negative.

23 Claims, 28 Drawing Sheets

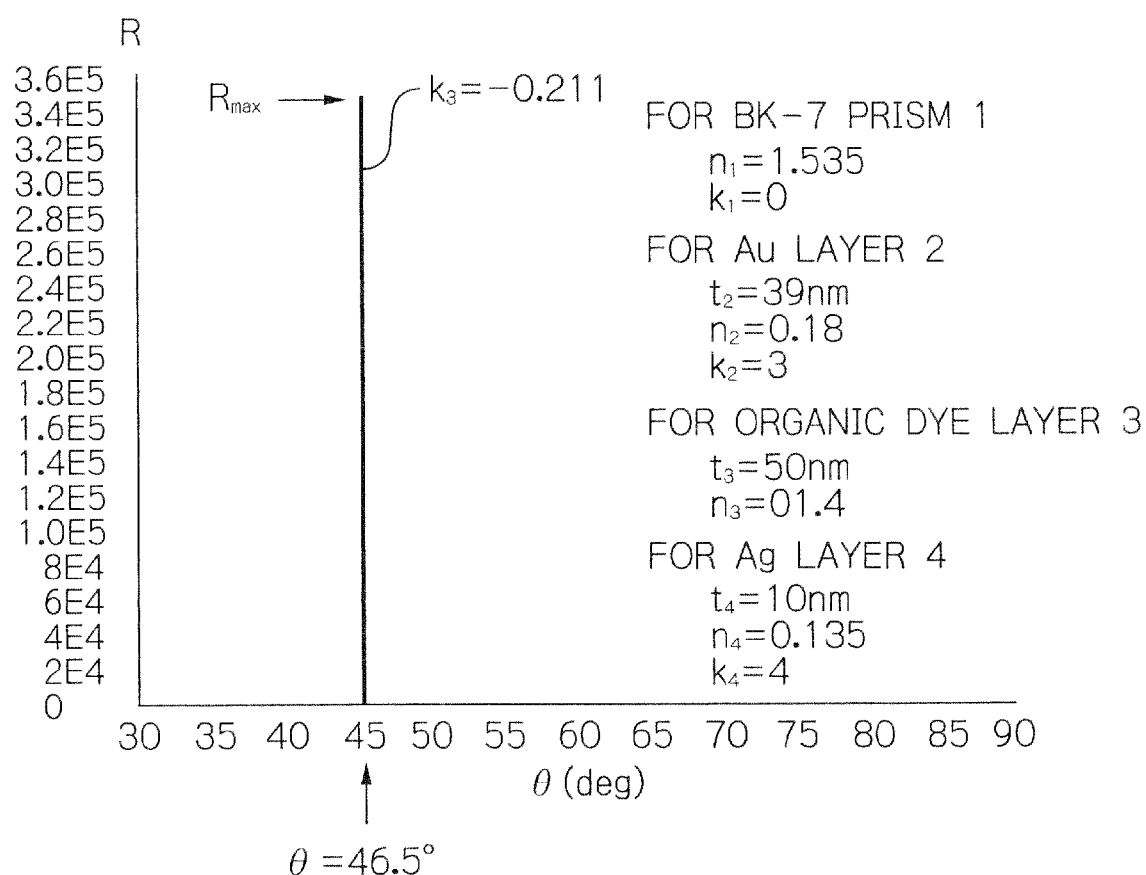

OPTICAL PULSE GENERATING APPARATUS USING PHOTOELECTRIC EFFECT OF SURFACE PLASMON RESONANCE PHOTONS AND ITS MANUFACTURING METHOD

BACKGROUND OF THE INVENTION

1. Field of the Invention

The present invention relates to an optical pulse generating apparatus for generating an ultrashort optical pulse signal such as a femtosecond (fs) optical pulse signal in an optical communication system and its manufacturing method.

2. Description of the Related Art

A prior art ultra-short optical pulse generating apparatus using titanium doped sapphire laser generating apparatus using broadband characteristics of a gain medium of titanium doped sapphire crystal (see: JP-2003-500861 A corresponding to WO 00/72412 A1).

The operational principle of the above-mentioned titanium doped sapphire laser generating apparatus is based upon self-phase modulation due to the optical Kerr effect of titanium doped sapphire crystal per se. According to the optical Kerr effect, when the intensity of incident laser light is small, the refractive index of laser crystal is small, while, when the intensity of incident laser light is large, the refractive index of laser crystal is large.

However, the above-described titanium doped sapphire laser generating apparatus is very large in size and high in manufacturing cost.

SUMMARY OF THE INVENTION

The present invention seeks to solve one or more of the above-described problems.

According to the present invention, an optical pulse generating apparatus is constructed by a metal layer having an incident/reflective surface adapted to receive incident light and output its reflective light as an optical pulse signal, a dielectric layer formed on an opposite surface of the metal layer opposing the incident/reflective surface, and a dielectric layer exciting unit adapted to excite the dielectric layer on a time basis, the incident light exciting surface plasmon resonance light in the metal layer while the dielectric layer is excited on a time basis so that an extinction coefficient of the dielectric layer is made negative. Thus, a pulse width of the optical pulse signal becomes shorter than a pulse width of an excited state of the dielectric layer.

Also, the dielectric layer exciting unit includes an optical pulse generating unit for generating another optical pulse signal or a current pulse generating unit for generating a current pulse signal. In this case, the pulse width of the other optical pulse signal or the pulse width of the current pulse signal is larger than a pulse width of the optical pulse signal. The other optical pulse signal and the current pulse signal are triangular-pulsed, hyperbolic secant-pulsed, or sinusoidal-pulsed.

Further, an incident angle of the incident light to the metal layer is a light absorption dip angle by which a reflectivity of the incident light at the incident/reflective surface of the metal layer is minimum in a total reflection region while the dielectric layer is not excited. Thus, the excited amount of surface plasmon resonance photons is maximum.

Still further, a thickness of the metal layer is determined so that the reflectivity of the incident light at the incident/reflective surface of the metal layer is minimum when the incident light is incident at the light absorption dip angle to the incident/reflective surface of the metal layer while the dielectric layer is not excited. Thus, the excited amount of surface plasmon resonance photons is maximum.

The metal layer comprises a gold (Au) layer or the like.

The dielectric layer comprises an organic dye layer or a semiconductor layer.

Further, a resonator layer is deposited on an opposite surface of the dielectric layer opposing the metal layer. The resonator layer comprises a silver (Ag) layer or a dielectric multi-layer mirror structure.

Also, according to the present invention, in a method for manufacturing an optical pulse generating apparatus comprising a metal layer having an incident/reflective surface adapted to receive incident light and output its reflective light as an optical pulse signal, and a dielectric layer deposited on an opposite surface of the metal layer opposing the incident/reflective surface, and a dielectric layer exciting unit adapted to excite the dielectric layer on a time basis, the incident light exciting surface plasmon resonance light in the metal layer while the dielectric layer is excited on a time basis so that an extinction coefficient of the dielectric layer is made negative, a thickness of the metal layer is determined, so that the reflectivity of the incident light at the incident/reflective surface of the metal layer is minimum in a total reflection region when the incident light is incident to the incident/reflective surface of the metal layer while the dielectric layer is not excited. Then, at least one candidate of an incident angle of the incident light to the metal layer and a thickness of the dielectric layer is determined, so that the reflectivity of the incident light at the incident/reflective surface of the metal layer is minimum in the total reflection region while the determined thickness of the metal layer is maintained and the dielectric layer is not excited. Finally, a thickness of the dielectric layer corresponding to an excited state of the dielectric layer is determined, so that the reflectivity of the incident light at the incident angle of the candidate is beyond a predetermined value while the thickness of the dielectric layer of the candidate is maintained.

Further, according to the present invention, in a method for manufacturing an optical pulse generating apparatus comprising a metal layer having an incident/reflective surface adapted to receive incident light and output its reflective light on a time basis, a dielectric layer deposited on an opposite surface of the metal layer opposing the incident/reflective surface, a resonator layer deposited on an opposite surface of the dielectric layer opposing the metal layer, and a dielectric layer exciting unit adapted to excite the dielectric layer on a time basis, the incident light exciting surface plasmon resonance light in the metal layer while the dielectric layer is excited on a time basis so that an extinction coefficient of the dielectric layer is made negative, a thickness of the resonator layer is determined in accordance with a predetermined transmittivity of the resonator layer. Then, a thickness of the dielectric layer is determined. Then, an incident angle of the incident light at the incident/reflective surface of the metal layer and a thickness of the metal layer are determined, so that the reflectivity of the incident light at the incident/reflective surface of the metal layer is minimum in a total reflection region when the incident, light is incident to the incident/reflective surface of the metal layer while the dielectric layer is not excited. Finally, a thickness of the dielectric layer corresponding to an excited state of the dielectric layer is determined, so that the reflectivity of the incident light at the incident angle is beyond a predetermined value while the incident angle of the incident light at the incident/reflective surface of the metal layer and the thickness of the dielectric layer are maintained.

BRIEF DESCRIPTION OF THE DRAWINGS

The above and other objects, advantages and features of the present invention will be more apparent from the following description of certain preferred embodiments, taken in conjunction with the accompanying drawings, wherein:

FIG. 19 is an ATR signal spectrum diagram for explaining the reflectivity at the selected incident angle at step 1705 of FIG. 17;

DETAILED DESCRIPTION OF PREFERRED EMBODIMENTS

Figure 1:
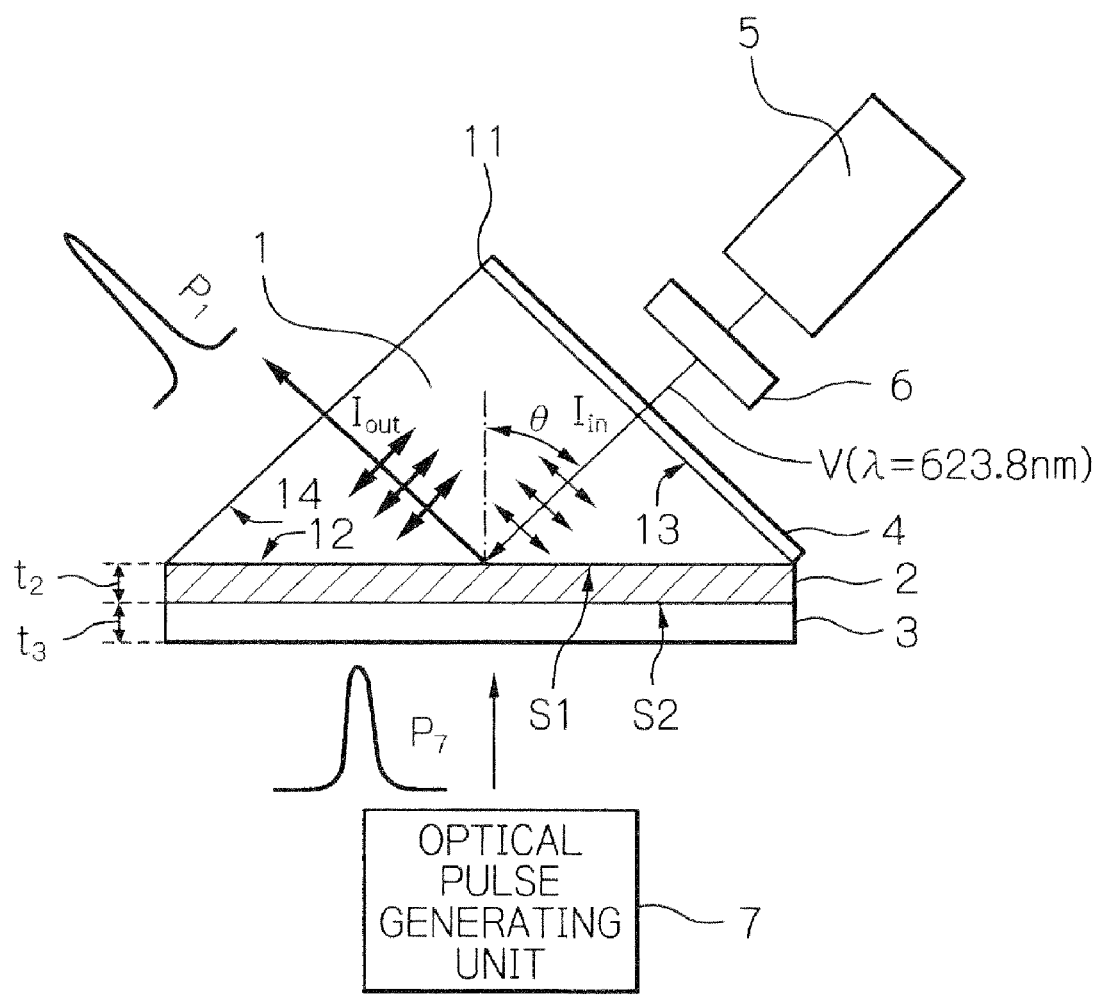
FIG. 1 is a cross-sectional view illustrating a first embodiment of the optical pulse generating apparatus according to the present invention.

In FIG. 1, which illustrates a first embodiment of the optical pulse generating apparatus according to the present invention, this optical pulse generating apparatus is constructed by a common glass prism or a BK-7 prism 1 as a transparent body for visible laser rays with a refractive index $n_1$ of 1.535 and a vertical angle of 90°, a gold (Au) layer 2 as a metal layer deposited by an evaporating process or the like on a surface 12 of the BK-7 prism 1 opposing the arris 11 thereof, and an organic dye layer 3 made of rhodamine B, for example, as a dielectric layer deposited on a surface S2 of the Au layer 2 opposing the incident/reflective surface S1 thereof.

The Au layer 2 is about 1 cm long and about 10 nm to 10 μm thick. If the thickness $t_2$ of the Au layer 2 is smaller than 10 nm, the Au layer 2 cannot sufficiently absorb evanescent photons generated therein. On the other hand, if the thickness $t_2$ of the Au layer 2 is larger than 10 μm, the generation of evanescent photons in the Au layer 2 is attenuated, so as not to excite surface plasmon resonance (SPR) photons in the Au layer 2.

Note that an about 1 to 2 nm thick metal layer made of Cr or the like may be deposited on the surface of the BK-7 prism 1 to enhance the contact characteristics between the Au layer 2 and the BK-7 prism 1.

The Au layer 2 may be replaced by an Au alloy layer, or a metal layer made of Ag, Cu, Al, Ir, Mo, Mi, Pt, Rh, W, Ti, V, Cr, Mn, Fe, Co, Nb, Pd, Ir, or their alloy.

An anti-reflection (AR) coating layer 4 is coated on a surface 13 of the BK-7 prism 1. In this case, the surface 13 and a surface 14 are crossed at the arris 11 of the BK-7 prism 1. Note that, if the incident loss caused by the reflectivity such as 8% of the BK-7 prism 1 is negligible, the AR coating layer 4 can be omitted.

Further, a He—Ne laser source 5 and a wavelength plate 6 are provided. As a result, a visible laser ray V whose wavelength λ is 623.8 nm is emitted from the He—Ne laser source 5 and is incident via the wavelength plate 6, the AR coating layer 4 and the BK-7 prism 1 to the Au layer 2. In this case, in order to generate evanescent photons in the Au layer 2, the rotational angle of the wavelength plate 6 can be adjusted, so that the visible laser ray V incident to the Au layer 2 is polarized, i.e., TM-polarized or P-polarized in parallel with the incident/reflective surface S1 of the Au layer 2.

Note that, since the visible laser ray V is linearly-polarized, the rotational angle of the He—Ne laser source 5 can be adjusted without provision of the wavelength plate 6 to emit the above-mentioned P-polarized light.

In the Au layer 2, SPR photons are excited by incident light, and, in the organic dye layer 3, a population inversion state is realized by the excitation due to the irradiation of an optical pulse signal $P_7$ (pumping light) from an optical pulse generating unit 7. Therefore, the extinction coefficient $k_3$ of the organic dye layer 3 is made negative. As a result, the output light (reflective light) intensity $I_{out}$ at the incident/reflective surface S1 of the Au layer 2 is about $10^7$ times the incident light intensity $I_{in}$ in accordance with the negative extinction coefficient $k_3$ of the organic dye layer 3. This is considered a resonance state between the SPR photons and the excitation state or population inversion state of the organic dye layer 3.

Note that the optical pulse generating unit 7 is constructed by a YAG laser unit or a semiconductor laser unit which is relatively inexpensive.

The organic dye layer 3 is formed by using a spin coating technology for depositing a host material called binaphthyl-poly(9,9-dioctylfluorene) (BN-POF) into an organic material in which rhodamine B is doped.

The operational principle of the optical pulse generating apparatus of FIG. 1 is to generate evanescent photons in the Au layer 2 by the visible laser ray V to excite photons on the surface S2 of the Au layer 2. In this case, since the visible laser ray V is P-polarized, the visible laser ray V has an electric field component in parallel with the surface of the Au layer 2 and another electric field perpendicular to the surface of the Au layer 2, so that the respective electric fields are amplified. For example, the intensity of the electric field of light incident to the Au layer 2 is made to be about ten times by the SPR photons generated therein. Therefore, since the intensity of the light incident to the Au layer 2 is represented by a square value of the electric field, the light incident to the Au layer 2 is amplified by about 100 (=10×10) times.

Regarding the surface plasmon resonance (SPR) photons, reference is made to Heinz Raether. "Surface Plasmons on Smooth and Rough Surfaces and on Gratings", Springer-Verlag Berlin Heidelberg New York, pp. 16-19, 1988.

Note that, since the wavelength λ of the visible laser ray V of the He—Ne laser source 5 is 632.8 nm and the wavelength of SPR photons of Au is about 600 to 1000 nm, the SPR photons would be excited.

Figure 2:
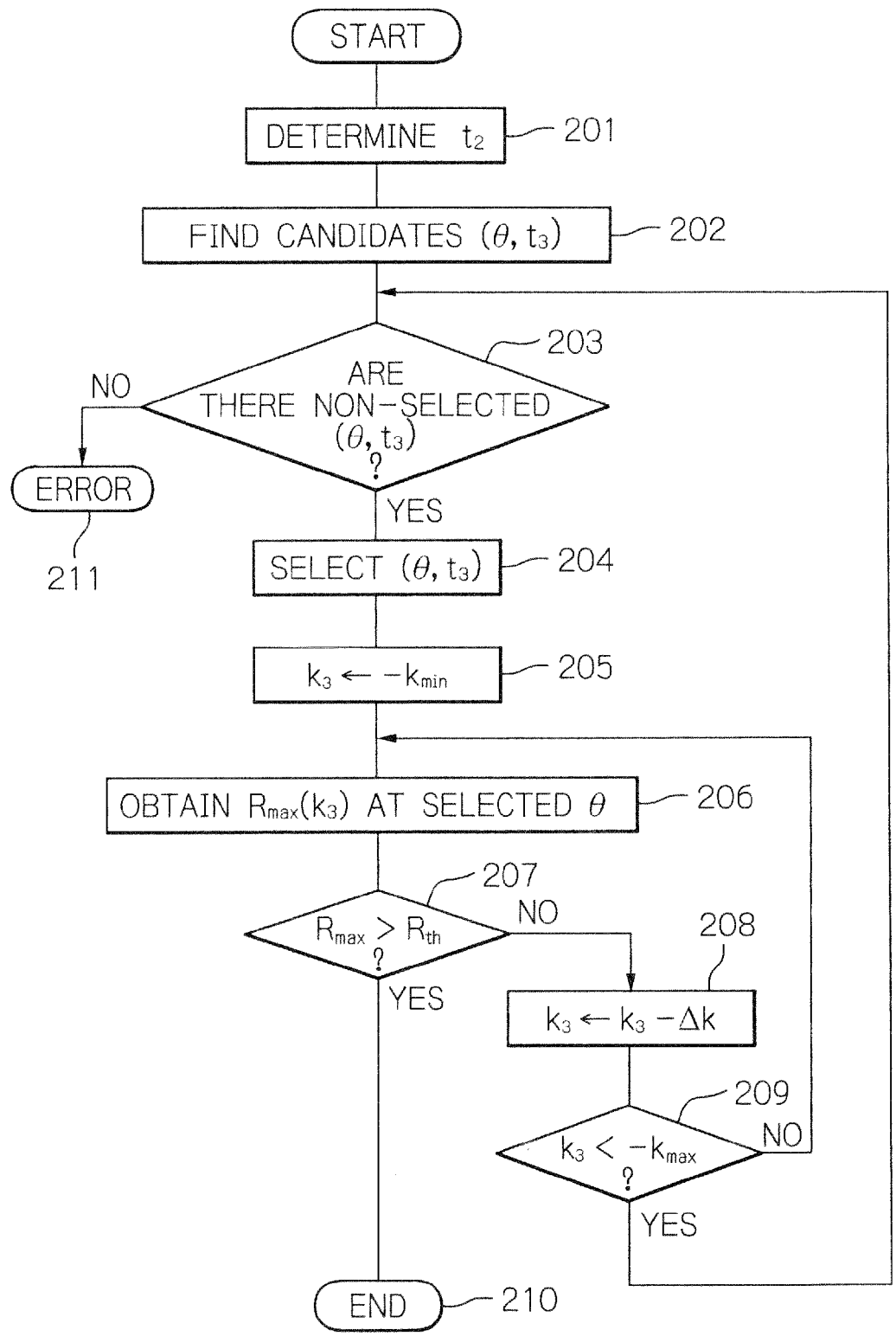
FIG. 2 is a flowchart for explaining a method for manufacturing the optical pulse generating apparatus of FIG. 1.

FIG. 2 is a flowchart for explaining a method for manufacturing the optical pulse generating apparatus of FIG. 1.

First, at step 201, an optimum thickness 12 of the Au layer 2 is determined. That is, if the incident angle θ of the visible laser ray V at the incident/reflective surface S1 of the Au layer 2 is an optimum incident angle $θ_{opt}$ (>$θ_c$, where $θ_c$ is a critical angle), the number of SPR photons excited on the surface S2 of the Au layer 2 of FIG. 1 is maximum. In other words, when $θ=θ_{opt}>θ_c$, the reflectivity R at the incident/reflective surface S1 of the Au layer 2 is minimum. In this case, FIG. 3 was obtained by a simulation which calculates a reflectivity R of light reflected from the incident/reflective surface S1 of the Au layer 2 by angularly scanning file BK-7 prism 1 with the visible laser ray V. This simulation can be carried out by the simulation software WinSpall (trademark) developed by Max Planck Institute.

Figure 3:
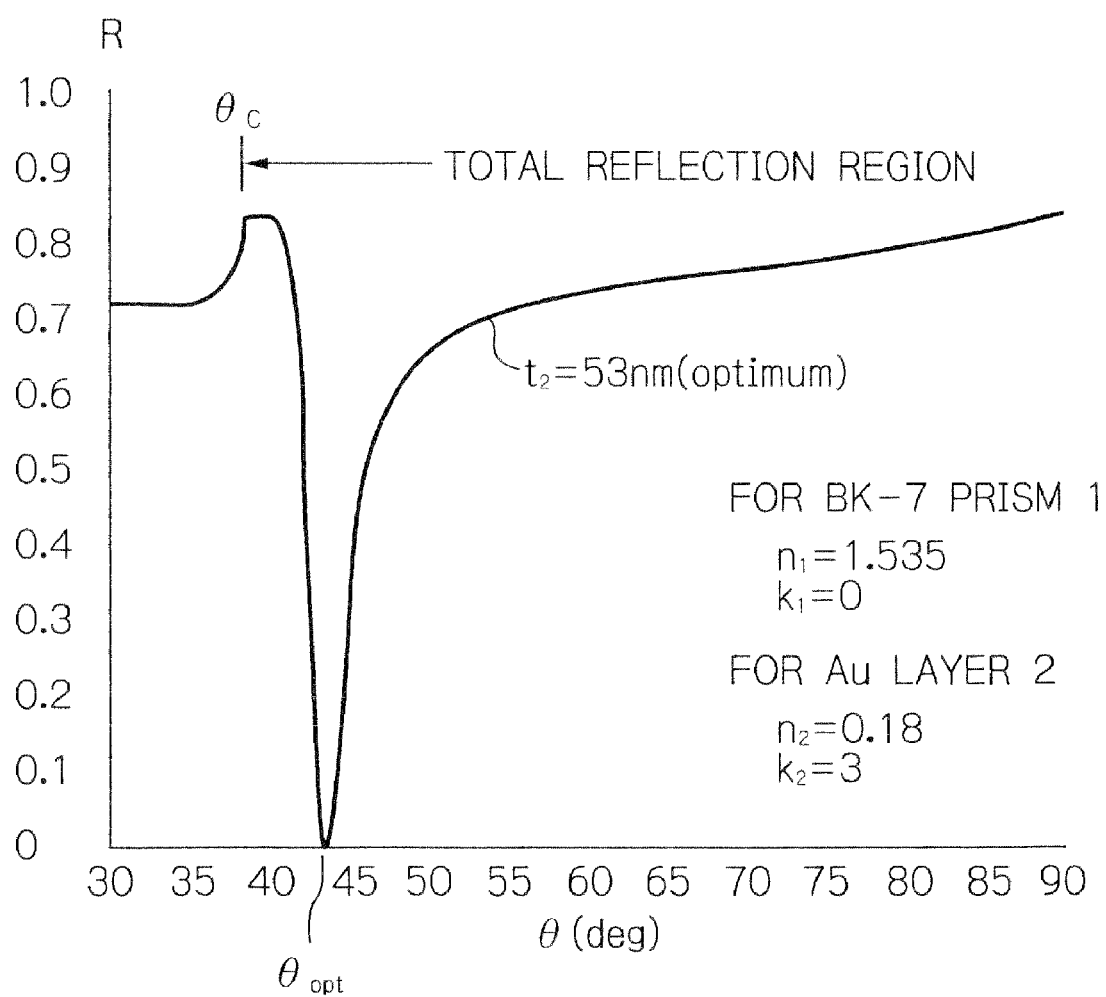
FIG. 3 is an attenuated total reflection (ATR) signal spectrum diagram for explaining determination of the thickness of the Au layer at step 201 of FIG. 2.

In FIG. 3, the simulation conditions are as follows:
1) The wavelength λ of the visible laser ray V is 632.8 nm.
2) For the BK-7 prism 1,
the refractive index $n_1$ is 1.535; and
the extinction coefficient $k_1$ is 0.
3) For the Au layer 2,
the refractive index $n_2$ is 0.18;
the extinction coefficient $k_2$ is 3; and
the thickness $t_2$ is variable.
4) For the organic dye layer 3,
the thickness $t_3$ is 0.
That is, the organic dye layer 3 is assumed to be absent.

In FIG. 3, only one ATR signal spectrum of the Au layer 2 whose thickness $t_2$ is 53 nm is selected from a plurality of ATR signal spectrums of the Au layer 2 whose thickness $t_2$ is variable. That is, the ATR signal spectrum of FIG. 3 shows that, if the thickness $t_2$ of the Au layer 2 is smaller than 10 nm, the Au layer 2 cannot sufficiently absorb evanescent photons generated therein, and if the thickness $t_2$ of the Au layer 2 is larger than 60 nm, the generation of evanescent photons in the Au layer 2 is attenuated, so as not to excite SPR photons in the Au layer 2, thus increasing the reflectivity at a plasmon dip. From FIG. 3, the ATR signal spectrum at $t_2$=53 nm shows a sharp plasmon dip where the reflectivity R is 0. Therefore, the thickness $t_2$ of the Au layer 2 is determined to be 53±1 nm, so that the excited SPR photons are maximum.

Figure 4:
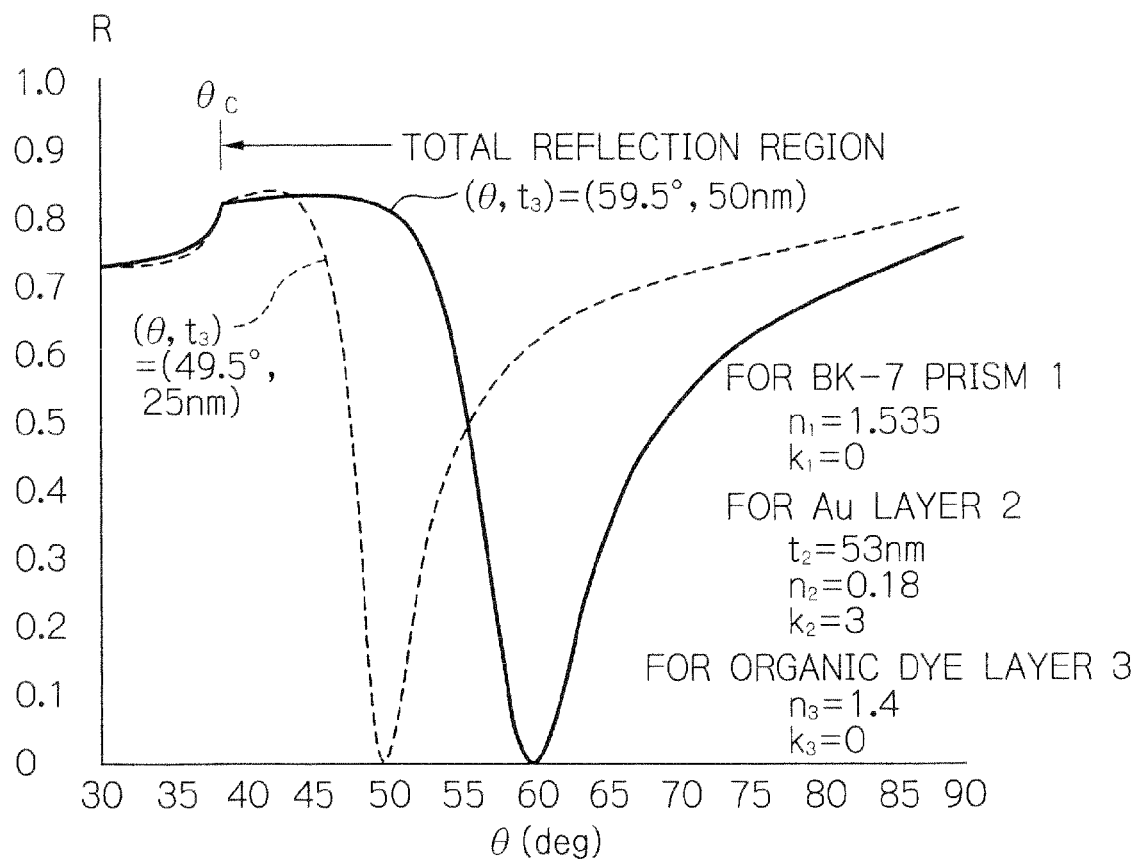
FIG. 4 is an ATR signal spectrum diagram for explaining candidates (the incident angle, the thickness of the organic dye layer) at step 202 of FIG. 2.

Next, at step 202, candidates (θ, $t_3$) where θ is the incident angle and $t_3$ is the thickness of the organic dye layer 3 are found. This step is carried out under the condition that the organic dye layer 3 is in a non-excited state ($k_3$=0). FIG. 4 was obtained by a simulation using the above-mentioned simulation software WinSpall (trademark) which calculates a reflectivity R of light reflected from the incident/reflective surface S1 of the Au layer 2 by angularly scanning the BK-7 prism 1 with the visible laser ray V where the thickness $t_2$ of the Au layer 2 is fixed at 53 nm while the thickness $t_3$ of the organic dye layer 3 is changed from 0 to 50 nm. In order to simplify the description, only two ATR signal spectrums at $t_3$=25 nm and 50 nm are illustrated in FIG. 4.

In FIG. 4, the simulation conditions are as follows:
1) The wavelength λ of the visible laser ray V is 632.8 nm.
2) For the BK-7 prism 1,
the refractive index $n_1$ is 1.535; and
the extinction coefficient $k_1$ is 0.
3) For the Au layer 2,
the thickness $t_2$ is 53 nm;
the refractive index $m_2$ is 0.18; and
the extinction coefficient $k_2$ is 3.
4) For the organic dye layer 3,
the thickness $t_3$ is variable;
the refractive index $n_3$ is 1.4; and
the extinction coefficient $k_3$ is 0.

As shown in FIG. 4, since the organic dye layer 3 has no absorption loss ($k_3$=0), when the thickness $t_3$ of the organic dye layer 3 is increased, the plasmon dip angle is shifted toward a higher angle where the depth of the plasmon dip is at a point of R=0, so that SPR photons can be excited regardless of the thickness $t_3$ of the non-excited organic dye layer 3. In order to simplify the description, it is assumed that only the following two candidates (θ, $t_3$) are found:

$$(θ, t_3) = (49.5°, 25 \text{ nm})$$

$$(θ, t_3) = (59.5°, 50 \text{ nm})$$

If at least one candidate (θ, $t_3$) is found, the flow proceeds from step 203 to step 204 which selects one candidate (θ, $t_3$). Otherwise, the flow proceeds from step 203 to step 211 which indicates an error.

That is, step 203 determines whether there are still non-selected candidates among the candidates (θ, $t_3$) found at step 202. If there is at least one non-selected candidate (θ, $t_3$), the flow proceeds to step 204 which selects one candidate (θ, $t_3$)

from the non-selected candidates, and then, steps 205 through 209 determine the extinction coefficient $k_3$ of the organic, dye layer 3, i.e., determine ($\theta$, $t_3$, $k_3$).

Note that the extinction coefficient $k_3$ of the organic dye layer 3 is defined by the intensity of its population inversion state which can be realized by irradiating the organic dye layer 3 with an additional pumping laser ray or injecting a current into the organic dye layer 3, instead of using the optical pulse signal $P_7$ of the optical pulse generating unit 7. That is, the extinction coefficient $k_3$ of the organic dye layer 3 is defined by $$k_3 = \rho_1 \cdot I$$

where I is the energy of the pumping laser ray or the injected current; and $\eta_1$ is a constant.

At step 205, the extinction coefficient $k_3$ of the organic dye layer 3 is initialized at $-k_{min}$ where $k_{min}$ is a positive value such as 0.001.

Next, at step 206, a reflectivity $R_{max}$ at the selected incident angle $\theta$ is obtained. For example, an ATR signal spectrum ($\theta$, $t_3$, $k_3$) using the above-mentioned simulation software Win-Spall (trademark) is calculated, and the reflectivity $R_{max}$ at the selected incident angle $\theta$ is obtained from this ATR signal spectrum. In this case, the reflectivity $R_{max}$ at the selected incident angle $\theta$ can be obtained by directly observing the reflectivity $R_{max}$.

Next, at step 207, it is determined whether or not $R_{max} > R_{th}$, where $R_{th}$ is a predetermined value such as 6E4 is satisfied. As a result, only when $R_{max} > R_{th}$, does the flow proceed to step 210 which completes the flowchart of FIG. 2. On the other hand, when $R_{max} \leq R_{th}$, the flow proceeds to steps 208 and 209 which renew the extinction coefficient $k_3$ by decreasing the extinction coefficient $k_3$ by $\Delta k$ such as 0.001, thus repeating the flow at steps 206 and 207. In this case, the extinction coefficient $k_3$ is guarded by step 209. That is, when $k_3 \geq k_{max}$ where $k_{max}$ is is a definite value such as 1.0, the flow proceeds from step 209 to steps 206 and 207. Otherwise, the flow proceeds from step 209 to step 203.

Thus, when the extinction coefficient $k_3$ of the organic dye layer 3 is changed from $k_{min}$ to $k_{max}$, the extinction coefficient $k_3$ is determined at the time when the reflectivity $R_{max}$ reaches $R_{th}$.

Note that if it is determined at step 203 that there is no non-selected candidate ($\theta$, $t_3$), the flow proceeds to step 211, which means it is impossible to determine the extinction coefficient $k_3$ of the organic dye layer 3.

Figure 5A:
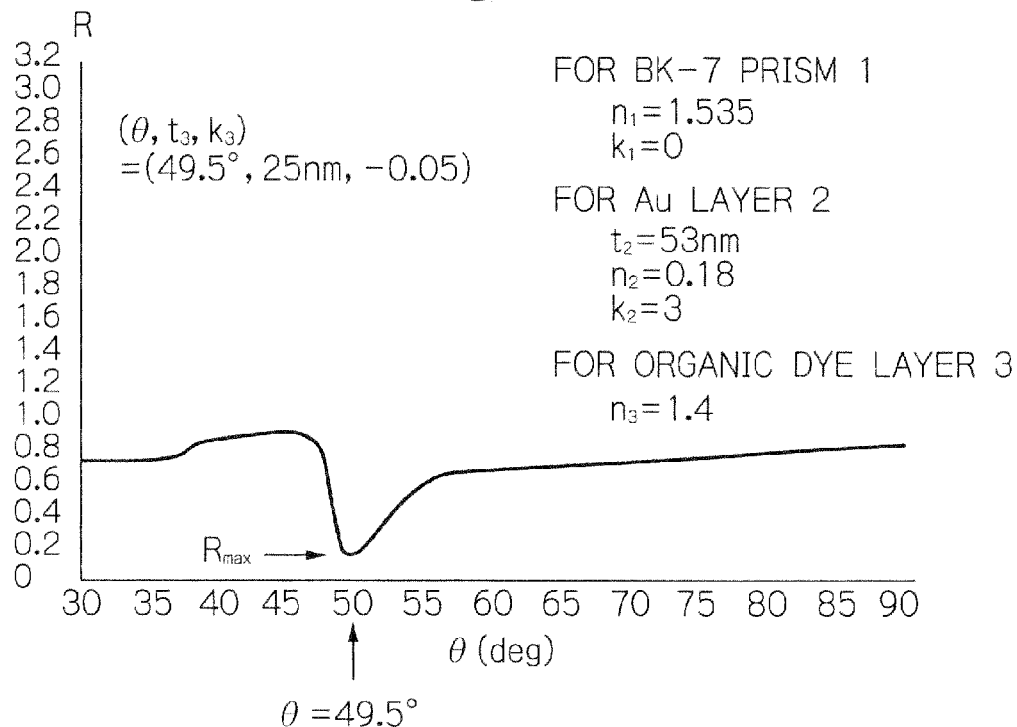
FIGS. 5A and 5B are ATR signal spectrum diagrams for explaining the reflectivity at the selected incident angle at step 206 of FIG. 2.

For example, when ($\theta$, $t_3$)=(49.5°, 25 nm) is selected at step 204 and $k_3=-0.05$ is obtained at step 208, an ATR signal spectrum as illustrated in FIG. 5A is obtained. In this case, the reflectivity $R_{max}$ at the selected incident angle $\theta$ (=49.5°) is small, so that the flow proceeds via steps 208 and 209 to step 206.

Figure 5B:
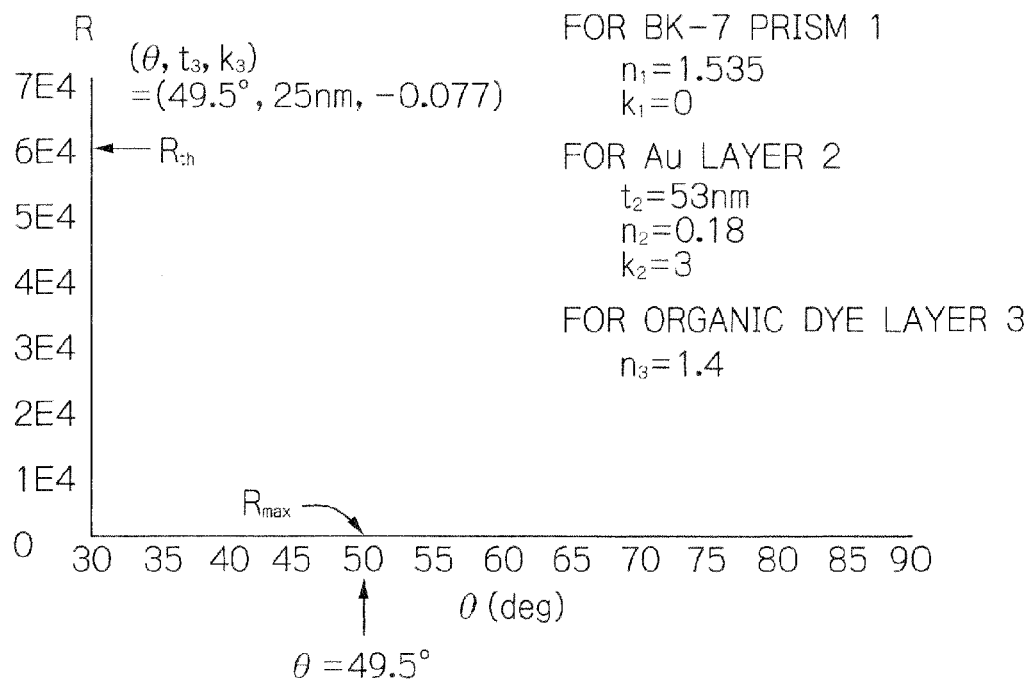

Next, when ($\theta$, $t_3$)=(49.5°, 25 nm) is maintained and $k_3=-0.077$ is obtained at step 208, an ATR signal spectrum as illustrated in FIG. 5B is obtained. Even in this case, the reflectivity $R_{max}$ at the selected incident angle $\theta$ (=49.5°) is small, so that the flow proceeds via steps 208 and 209 to step 206.

Figure 6A:
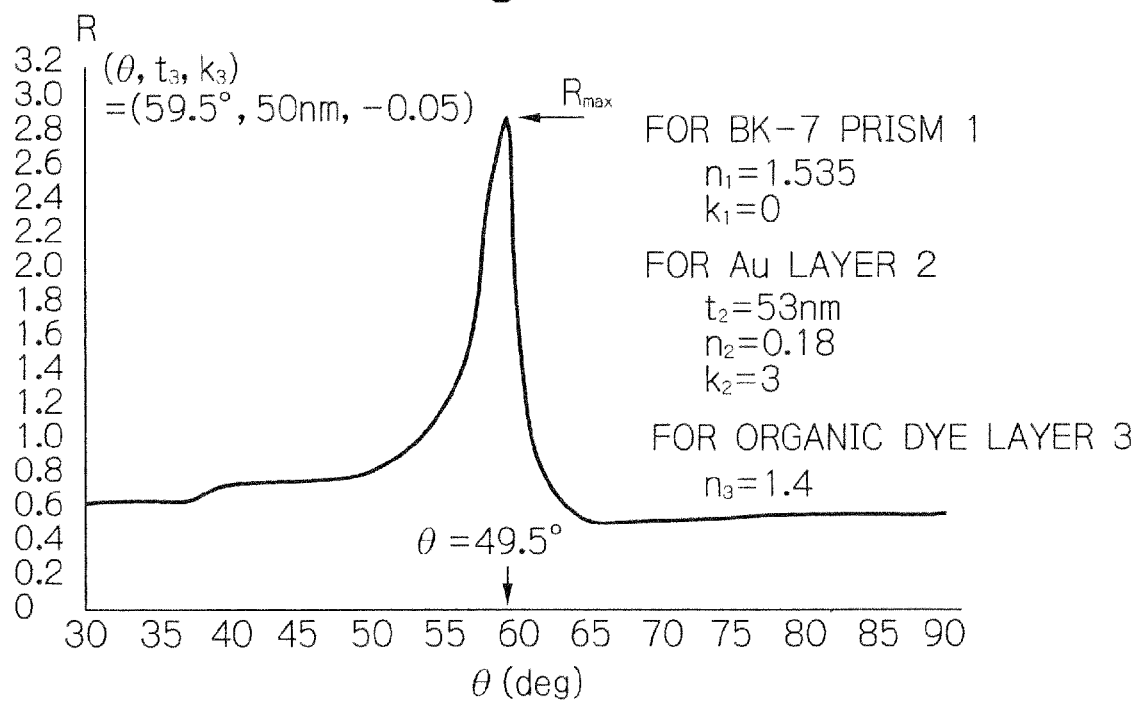
FIGS. 6A and 6B are ATR signal spectrum diagrams for explaining the reflectivity at the selected incident angle at step 206 of FIG. 2.

Next, when ($\theta$, $t_3$)=(59.5°, 50 nm) is selected at step 204 and $k_3=-0.05$ is obtained at step 208, an ATR signal spectrum as illustrated in FIG. 6A is obtained. Even in this case, the reflectivity $R_{max}$ at the selected incident angle $\theta$ (=59.5°) is small, so that the flow proceeds via steps 208 and 209 to step 206.

Figure 6B:
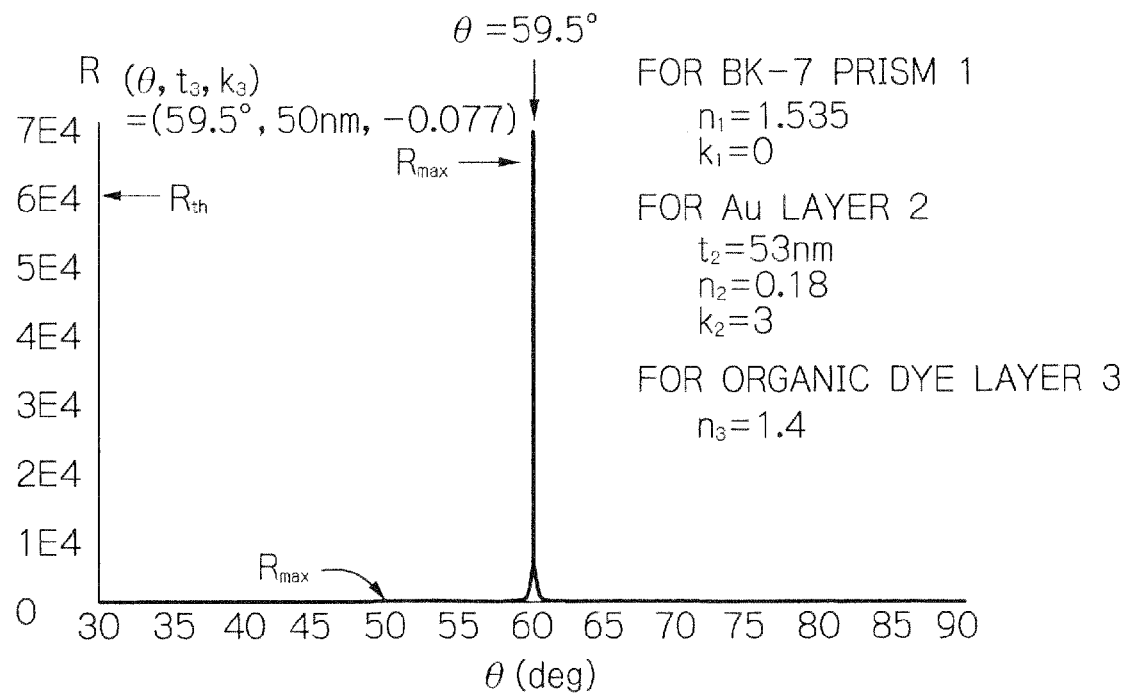

Finally, when ($\theta$, $t_3$)=(59.5°, 50 nm) is maintained and $k_3=-0.077$ is obtained at step 208, an ATR signal spectrum as illustrated in FIG. 6B is obtained. In this case, the reflectivity $R_{max}$ at the selected incident angle $\theta$ (=59.5°) is large, so that, the flow proceeds to step 210.

Thus, ($\theta$, $t_3$, $k_3$)=(59.5°, 50 nm, 0.077) is finally determined.

In FIGS. 5A, 5B, 6A and 6B, note that the simulation conditions are as follows:
1) The wavelength $\lambda$ of the visible laser ray V is 632.8 nm.
2) For the BK-7 prism 1,
   the refractive index $n_1$ is 1.535; and
   the extinction coefficient $k_1$ is 0.
3) For the Au layer 2,
   the refractive index $n_2$ is 0.18;
   the extinction coefficient $k_2$ is 3; and
   the thickness $t_2$ is 53 nm,
4) For the organic dye layer 3,
   the refractive index $n_3$ is 1.4.

In the case of the thickness $t_3$ of the organic dye layer 3 being 50 nm, when the extinction coefficient $k_3$ is $-0.05$ as illustrated in FIG. 6A, the reflectivity $R_{max}$ at the selected incident angle $\theta=59.5°$ cannot reach the threshold value $R_{th}$, while when the extinction coefficient $k_3$ is $-0.077$ as illustrated in FIG. 6B, the reflectivity $R_{max}$ at the selected incident angle $\theta=59.5°$ is very large beyond the threshold value $R_{th}$. Therefore, ($\theta$, $t_3$)=(59.5°, 50 nm) is determined.

Figure 7A:
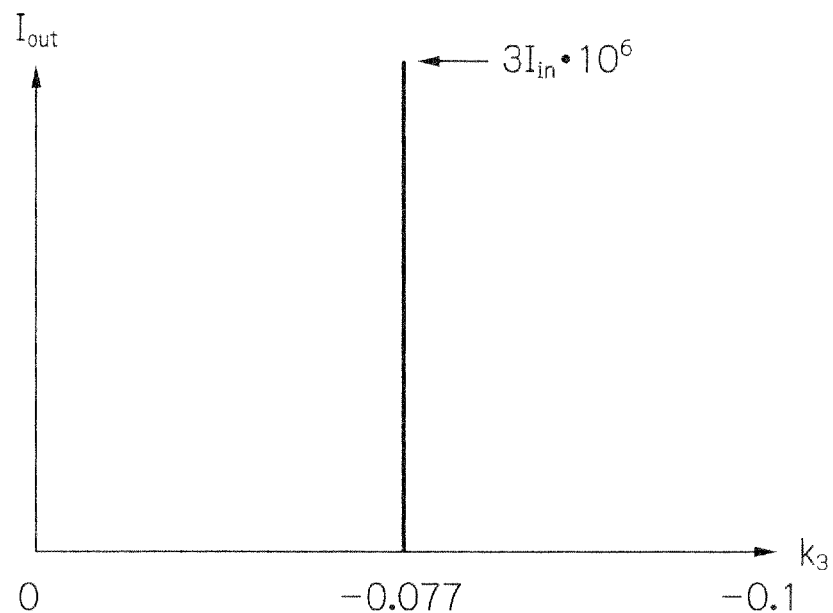
FIGS. 7A and 7B are graphs for illustrating a relationship between the extinction coefficient of the organic dye layer and the intensity of the output optical pulse signal of FIG. 1.
Figure 7B:
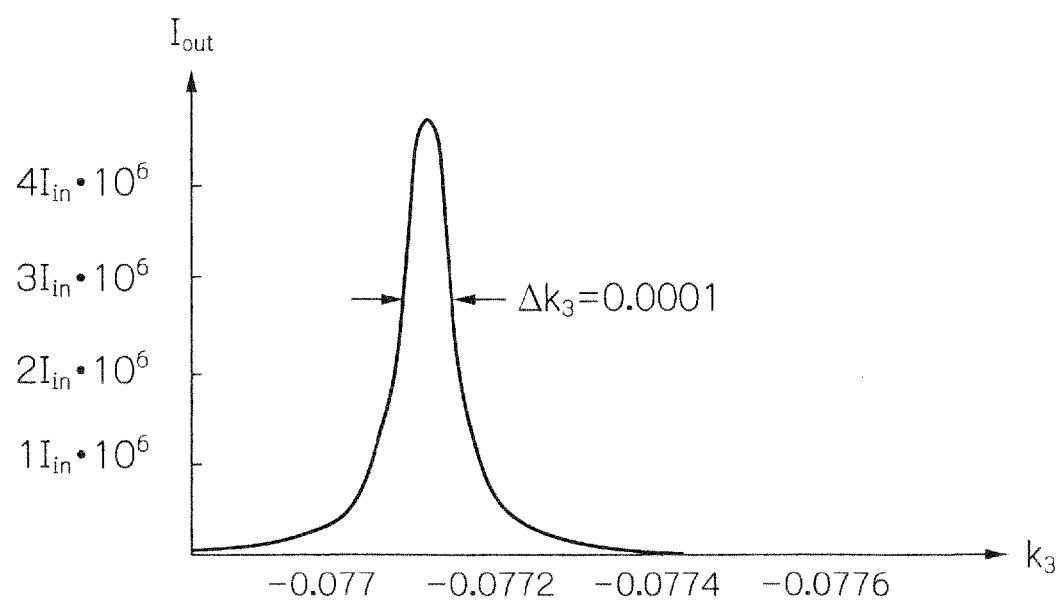

On the other hand, the extinction coefficient $k_3$ of the organic dye layer 3 can be changed in accordance with the excitation intensity I of the organic dye layer 3, i.e., $k_3=\eta_1 I$. Therefore, since the optical pulse signal $P_7$ of the optical pulse generating unit 7 can be changed on a time basis, the extinction coefficient $k_3$ of the organic dye layer 3 can be changed from 0 to $-0.1$, as illustrated in FIG. 7A and FIG. 7B which is an enlargement of FIG. 7A in the proximity of $k_3=-0.077$. As a result, only when $k_3=-0.077$, can a reflective pulse, i.e., an output optical pulse signal $P_1$ having a very large output light intensity $I_{out}$ be generated.

In FIG. 7B, note that a full width half-magnitude (FWHM) $\Delta k_3$ of the extinction coefficient $k_3$ is 0.0001.

Figure 8A:
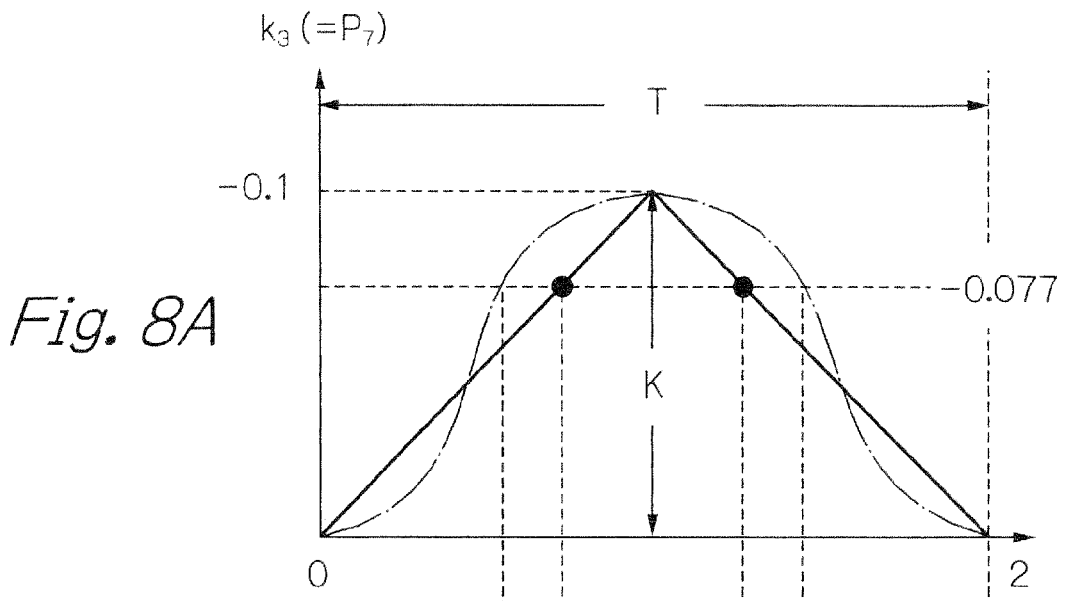
FIGS. 8A and 8B are timing diagrams of the extinction coefficient of the organic dye layer and the intensity of the output optical pulse signal, respectively, of FIG. 1.

As illustrated in FIG. 8A, it is assumed that the intensity of the optical pulse signal $P_7$ of the optical pulse generating unit 7 is triangular-pulsed so that the extinction coefficient $k_3$ of the organic dye layer 3 is changed from 0 to $-0.1$ and from $-0.1$ to 0 where a time period T is 2 ns and a change amount K of $k_3$ is 0.1. In this case, an FWHM $\Delta t$ of the output optical pulse signal $P_1$ is calculated as follows:

$$K : T/2 = \Delta k_3 : \Delta t$$
$$\therefore \Delta t = \Delta k_3 \cdot (T/2)/K$$
$$= 0.0001 \cdot 1 \text{ ns}/0.1$$
$$= 0.001 \text{ ns}$$
$$= 1 \text{ ps}$$

Figure 8B:
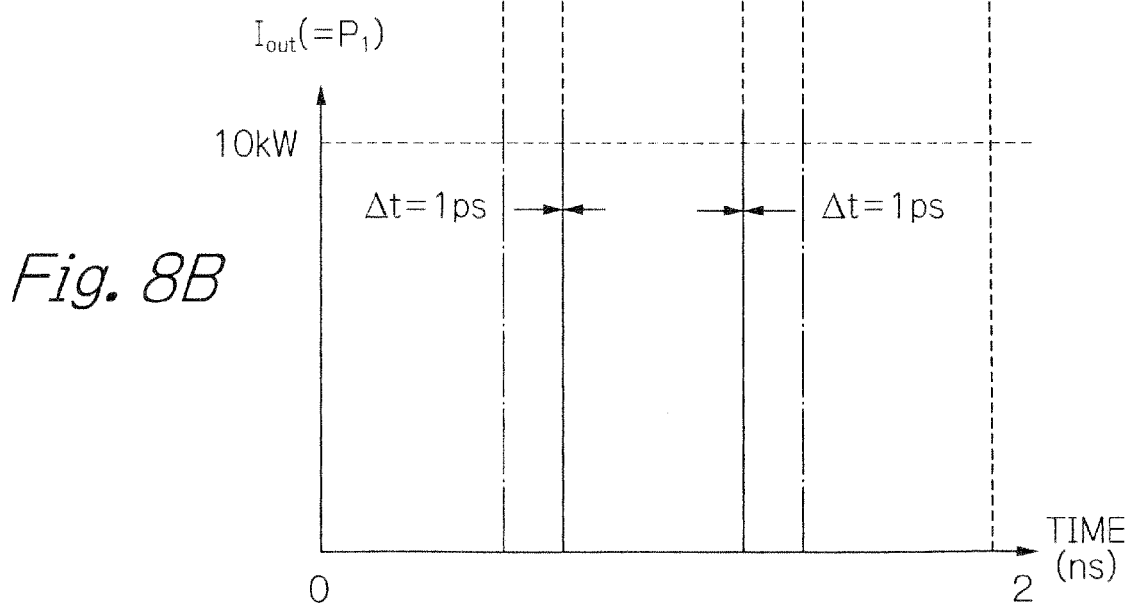

That is, when the optical pulse signal $P_7$ of as illustrated in FIG. 8A is used, the output optical pulse signal $P_1$ as illustrated in FIG. 8B is obtained. In this case, if the intensity $I_{in}$ of the incident light of the He—Ne laser source 5 is 10 mW, the output optical pulse signal $P_1$ has a peak output light intensity $I_{out}$ of about 100 kW which is about $10^7$ times the incident light intensity $I_{in}$.

In FIG. 8A, the optical pulse signal $P_7$ of the optical pulse generating unit 7 is triangular-pulsed; however, the optical pulse signal $P_7$ is not limited to a triangular-pulsed wave. For example, the optical pulse signal $P_7$ can be sinusoidal-pulsed as indicated by a dotted solid line in FIG. 8A. In this case, the peak output light intensity $I_{out}$ is indicated by a dotted solid line in FIG. 8B.

Figure 9:
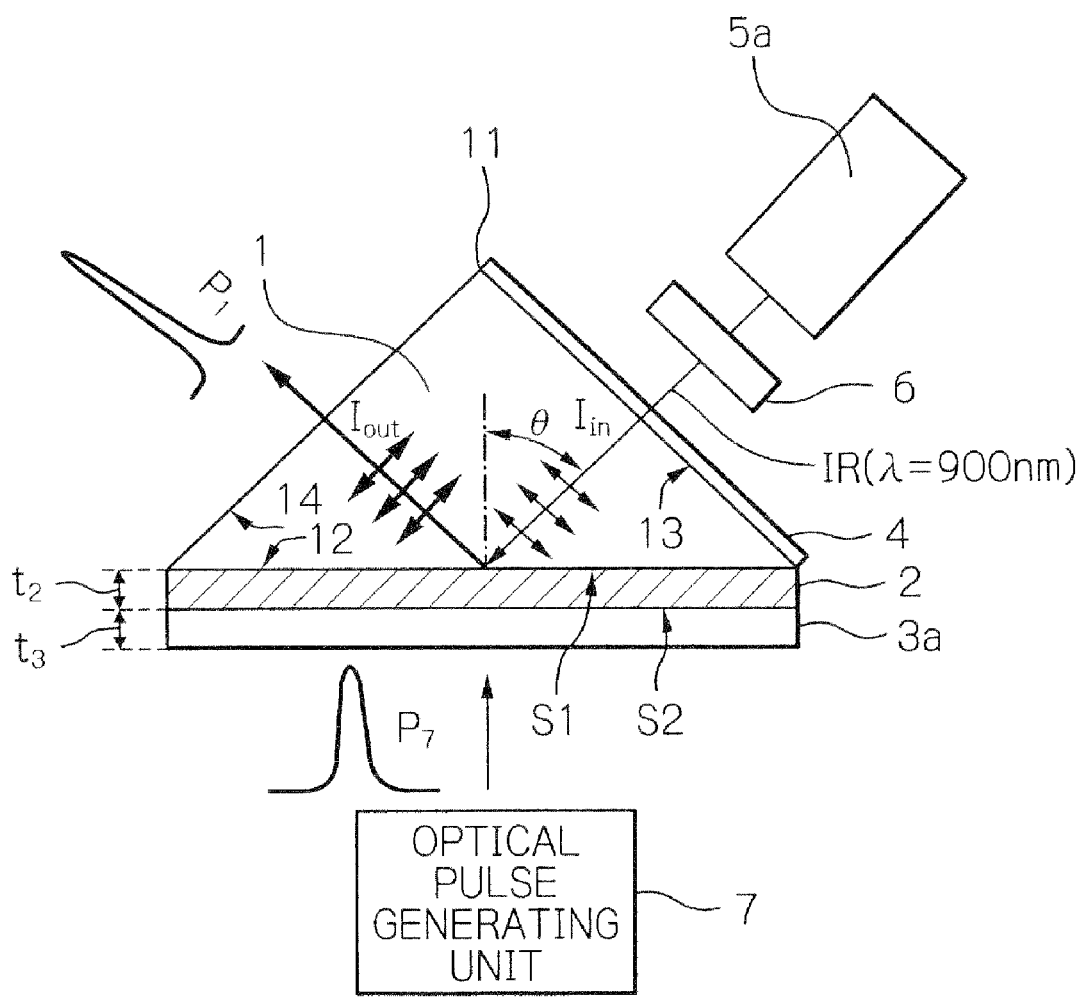
FIG. 9 is a cross-sectional view illustrating a second embodiment of the optical pulse generating apparatus according to the present invention.

In FIG. 9, which illustrates a second embodiment of the optical pulse generating apparatus according to the present invention, the organic dye layer 3 of FIG. 1 is replaced by a semiconductor layer such as a GaAs layer 3a with a large gain coefficient α, and the He—Ne laser source 5 of FIG. 1 is replaced by an infrared laser source 5a for generating a 900 nm infrared laser ray IR in response to the bandgap of GaAs.

In the Au layer 2, SPR photons are excited by incident light, and, in the GaAs layer 3a, a population inversion state is realized by the excitation due to the irradiation of the optical pulse signal $P_7$ (pumping light) of the optical pulse generating unit 7. Therefore, the extinction coefficient $k_{3a}$ of the GaAs layer 3a is made negative. As a result, the output light (reflective light) intensity $I_{out}$ at the incident/reflective surface S1 of the Au layer 2 is about $10^{12}$ times the incident light intensity $I_{in}$ in accordance with the negative extinction coefficient $k_{3a}$ of the GaAs layer 3a. This is considered a resonance state between the SPR photons and the excitation state or population inversion state of the GaAs layer 3a. Also, this output light has a small beam divergence angle.

The operational principle of the optical pulse generating apparatus of FIG. 9 is the same as that of the optical pulse generating apparatus of FIG. 1.

Note that, since the wavelength λ of the infrared laser ray IR of the infrared laser source 5a is 900 nm and the wavelength of SPR photons of Au is about 600 to 1000 nm, the SPR photons would be excited.

Figure 10:
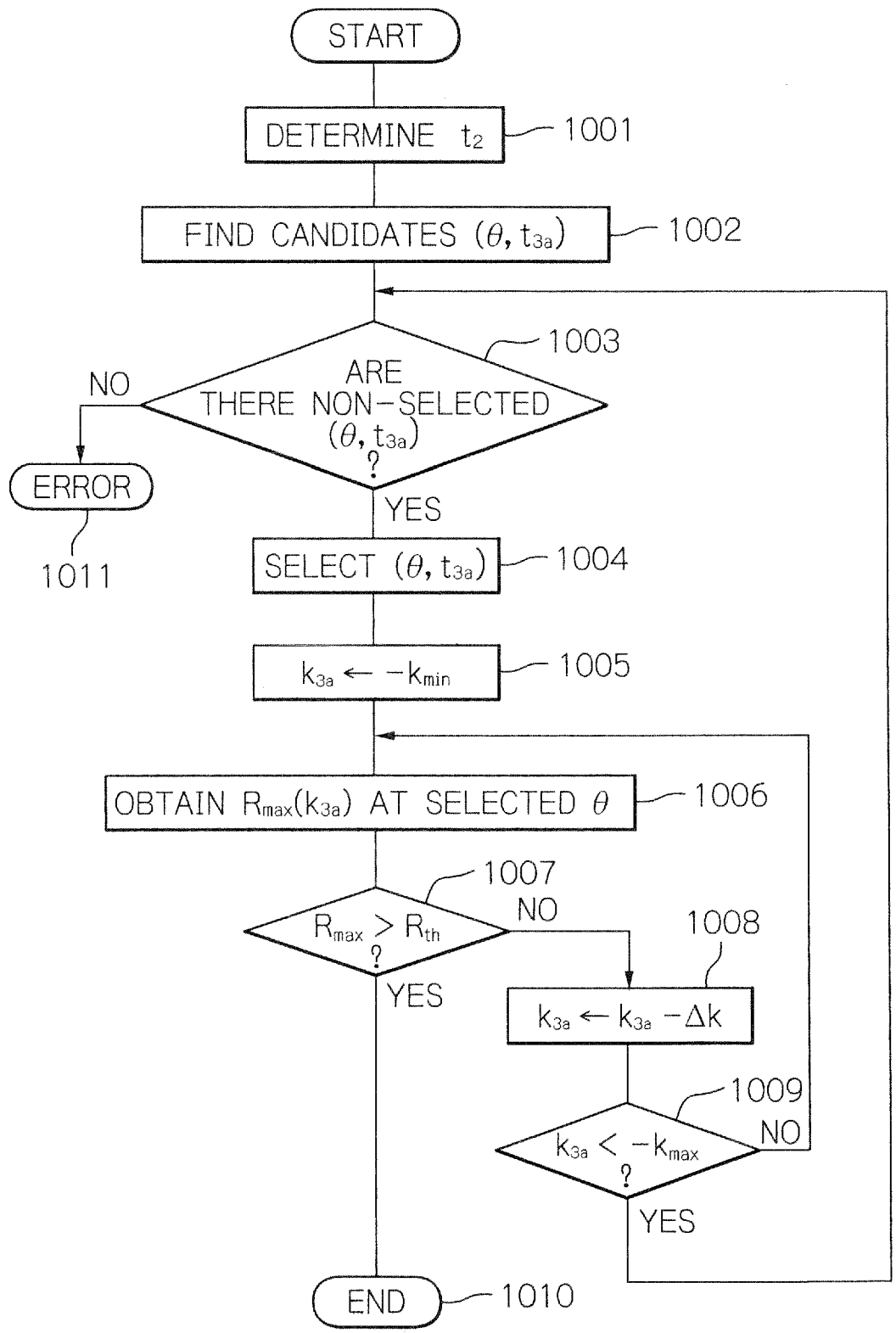
FIG. 10 is a flow chart for explaining a method for manufacturing the optical pulse generating apparatus of FIG. 9.

FIG. 10 is a flowchart for explaining a method for manufacturing the optical pulse generating apparatus of FIG. 9.

First, at step 1001, an optimum thickness $t_2$ of the Au layer 2 is determined. That is, if the incident angle θ of the infrared laser ray IR at the incident/reflective surface S1 of the Au layer 2 is an optimum incident angle $\theta_{opt}$ (>$\theta_c$ where $\theta_c$ is a critical angle), the number of SPR photons excited on the surface S2 of the Au layer 2 of FIG. 9 is maximum. In other words, when $\theta=\theta_{opt}>\theta_c$, the reflectivity R at the incident/reflective surface S1 of the Au layer 2 is minimum. In this case, an ATR signal spectrum (not shown) was obtained by a simulation which calculates a reflectivity R of light reflected from the incident/reflective surface S1 of the Au layer 2 by angularly scanning the BK-7 prism 1 with the infrared laser ray IR. This simulation can be carried out by the simulation software WinSpall (trademark) developed by Max Planck Institute.

In this case, the simulation conditions are as follows:
1) The wavelength λ of the infrared laser ray IR is 900 nm.
2) For the BK-7 prism 1,
the refractive index $n_1$ is 1.535; and
the extinction coefficient $k_1$ is 0.
3) For the Au layer 2,
the refractive index $n_2$ is 0.22;
the extinction coefficient $k_2$ is 6; and
the thickness $t_2$ is variable.
4) For the GaAs layer 3a,
the thickness $t_{3a}$ is 0.
That is, the GaAs layer 3a is assumed to be absent.

As a result, the ATR signal spectrum at $t_2$=39 nm shows a sharp plasmon dip where the reflectivity R is 0. Therefore, the thickness $t_2$ of the Au layer 2 is determined to be 39±1 nm, so that the excited SPR photons are maximum.

Figure 11:
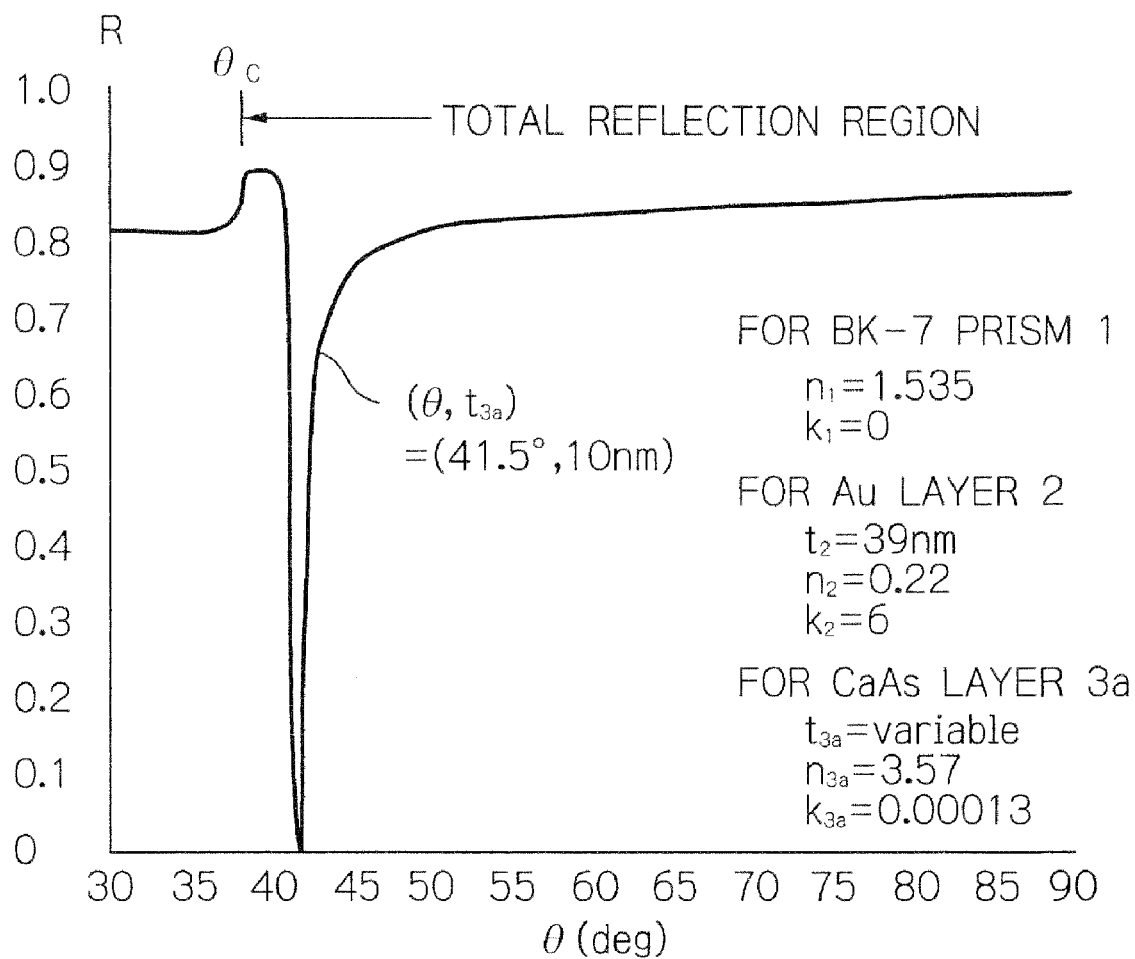
FIG. 11 is an ATR signal spectrum diagram for explaining candidates (the incident angle, the thickness of the GaAs layer) at step 1002 of FIG. 10.

Next, at step 1002, candidates (θ, $t_{3a}$) where θ is the incident angle and $t_{3a}$ is the thickness of the GaAs layer 3a are found. This step is carried out under the condition that the GaAs layer 3a is in a non-excited state ($k_{3a}$=0). FIG. 11 was obtained by a simulation using the above-mentioned simulation software WinSpall (trademark) which calculates a reflectivity R of light reflected from the incident/reflective surface S1 of the Au layer 2 by angularly scanning the BK-7 prism 1 with the infrared laser ray IR where the thickness $t_2$ of the Au layer 2 is fixed at 39 nm while the thickness $t_{3a}$ of the GaAs layer 3a is changed from 0 to 50 nm. In order to simplify the description, only one ATR signal spectrum at $t_{3a}$=10 nm is illustrated in FIG. 11.

In FIG. 11, the simulation conditions are as follows:
1) The wavelength λ of the infrared laser ray IR is 900 nm.
2) For the BK-7 prism 1,
the refractive index $n_1$ is 1.535; and
the extinction coefficient $k_1$ is 0.
3) For the Au layer 2,
the thickness $t_2$ is 39 nm;
the refractive index $n_2$ is 0.22; and
the extinction coefficient $k_2$ is 6.
4) For the GaAs layer 3a,
the thickness $t_{3a}$ is variable;
the refractive index $n_{3a}$ is 3.57; and
the extinction coefficient $k_{3a}$ is 0.00013.

As shown in FIG. 11, since the GaAs layer 3a has a little absorption loss ($k_3$=0.00013), when the thickness $t_{3a}$ of the GaAs layer 3a is 10 nm, a sharp plasmon dip is observed at a point of R=0. In order to simplify the description, it is assumed that only the following one candidate (θ, $t_{3a}$) is found:

$$(\theta, t_{3a}) = (41.5°, 10 \text{ nm})$$

If at least one candidate (θ, $t_{3a}$) is found, the flow proceeds from step 1003 to step 1004 which selects one candidate (θ, $t_3a$). Otherwise, the flow proceeds from step 1003 to step 1011 which indicates an error.

That is, step 1003 determines whether there are still non-selected candidates among the candidates (θ, $t_{3a}$) found at step 1002. If there is at least one non-selected candidate (θ, $t_{3a}$), the flow proceeds to step 1004 which selects one candidate (θ, $t_{3a}$) from the non-selected candidates, and then, steps 1005 through 1009 determine the extinction coefficient $k_{3a}$ of the GaAs layer 3a, i.e., determines (θ, $t_{3a}$, $k_{3a}$).

Note that the extinction coefficient $k_{3a}$ of the GaAs layer 3a is defined by the intensity of its population inversion state which can be realized by irradiating the GaAs layer 3a with an additional pumping laser ray or injecting a current into the GaAs layer 3a, instead of using the optical pulse signal $P_7$ of the optical pulse generating unit 7. That is, the extinction coefficient $k_{3a}$ of the GaAs layer 3a is defined by $$k_{3a} = \eta_2 \cdot I$$

where I is the energy of the pumping laser ray or the injected current; and
$\eta_2$ is a constant.

At step 1005, the extinction coefficient $k_{3a}$ of the GaAs layer 3a is initialized at $-k_{min}$ where $k_{min}$ is a positive value such as 0.001.

Next, at step 1006, a reflectivity $R_{max}$ at the selected incident angle θ is obtained. For example, an ATR signal spectrum (θ, $t_{3a}$, $k_{3a}$) using the above-mentioned simulation software WinSpall (trademark) is calculated, and the reflectivity $R_{max}$ at the selected incident angle θ is obtained from this ATR signal spectrum. In this case, the reflectivity $R_{max}$ at the selected incident angle θ can be obtained by directly observing the reflectivity $R_{max}$.

Next, at step 1007, it is determined whether or not $R_{max}>R_{th}$ where $R_{th}$ is a predetermined value such as 6E4 is satisfied. As a result, only when $R_{max}>R_{th}$, does the flow proceed to step 1010 which completes the flowchart of FIG. 10. On the other hand, when $R_{max} \leq R_{th}$, the flow proceeds to steps 1008 and 1009 which renew the extinction coefficient $k_{3a}$ by decreasing the extinction coefficient $k_{3a}$ by $\Delta k$ such as 0.001, thus repeating the flow at steps 1006 and 1007. In this case, the extinction coefficient $k_{3a}$ is guarded by step 1009. That is, when $k_{3a} \geq -k_{max}$ where $k_{max}$ is a definite value such as 1.0, the flow proceeds from step 1009 to steps 1006 and 1007. Otherwise, the flow proceeds from step 1009 to step 1003.

Thus, when the extinction coefficient $k_{3a}$ of the GaAs layer 3a is changed from $k_{min}$ to $k_{max}$, the extinction coefficient $k_{3a}$ is determined at the time when the reflectivity R reaches $R_{th}$.

Note that, when it is determined that there is no non-selected candidate ($\theta$, $t_{3a}$) at step 1003, the flow proceeds to step 1011, which means it is impossible to determine the extinction coefficient $k_{3a}$ of the GaAs layer 3a.

Figure 12:
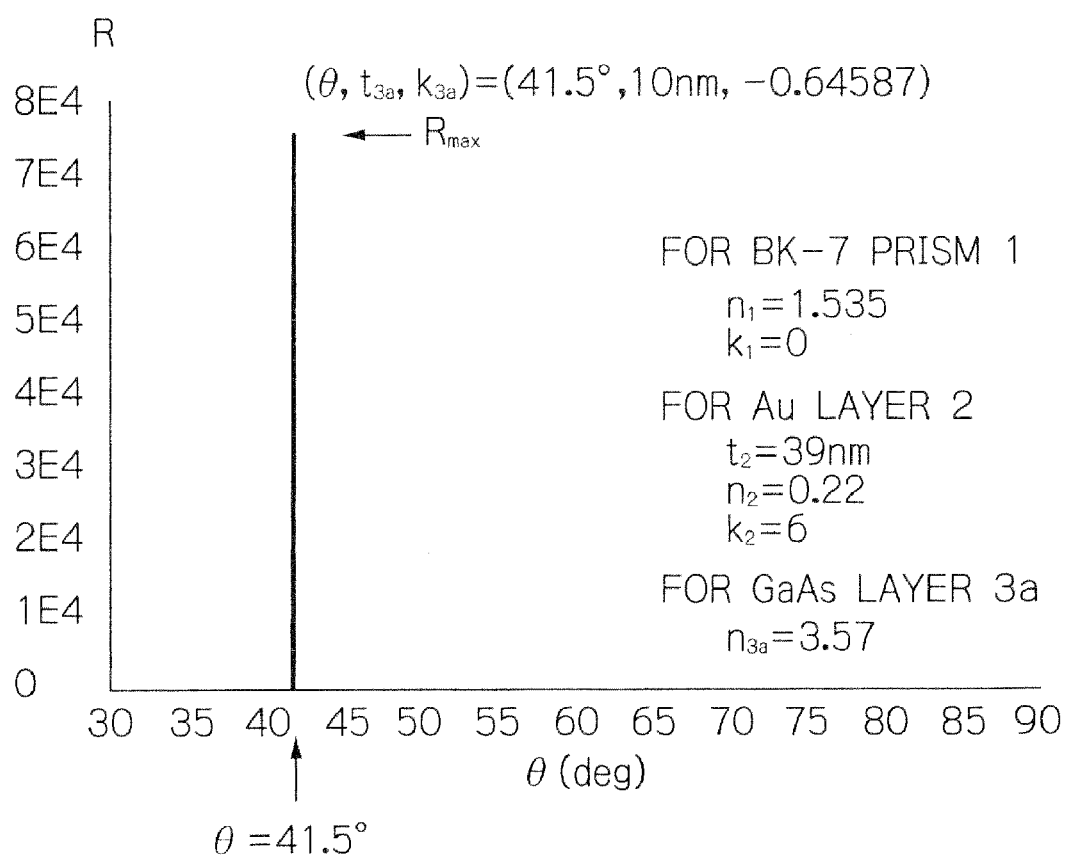
FIG. 12 is an ATR signal spectrum diagram for explaining the reflectivity at the selected incident angle at step 1006 of FIG. 10.

For example, when ($\theta$, $t_{3a}$)=(41.5°, 10 nm) is selected at step 1004 and $k_{3a}$=−0.64587 is obtained at step 1008, an ATR signal spectrum as illustrated in FIG. 12 is obtained. In this case, the reflectivity $R_{max}$ at the selected incident angle $\theta$ (=41.5°) is large, so that the flow proceeds via to step 1010.

Thus, ($\theta$, $t_{3a}$, $k_{3a}$)=(41.5°, 10 nm, −0.64587) is finally determined.

In FIG. 12, note that the simulation conditions are as follows:
1) The wavelength $\lambda$ of the infrared laser ray IR is 900 nm.
2) For the BK-7 prism 1,
the refractive index $n_1$ is 1.535; and
the extinction coefficient $k_1$ is 0.
3) For the Au layer 2,
the refractive index $n_2$ is 0.22;
the extinction coefficient $k_2$ is 6; and
the thickness $t_2$ is 39 nm.
4) For the GaAs layer 3a,
the refractive index $n_{3a}$ is 3.57.

As stated above, the extinction coefficient $k_{3a}$ of the GaAs layer 3a can be easily changed from 0 to −0.1 (negative value) in accordance with the excitation intensity of the GaAs layer 3a.

Figure 13:
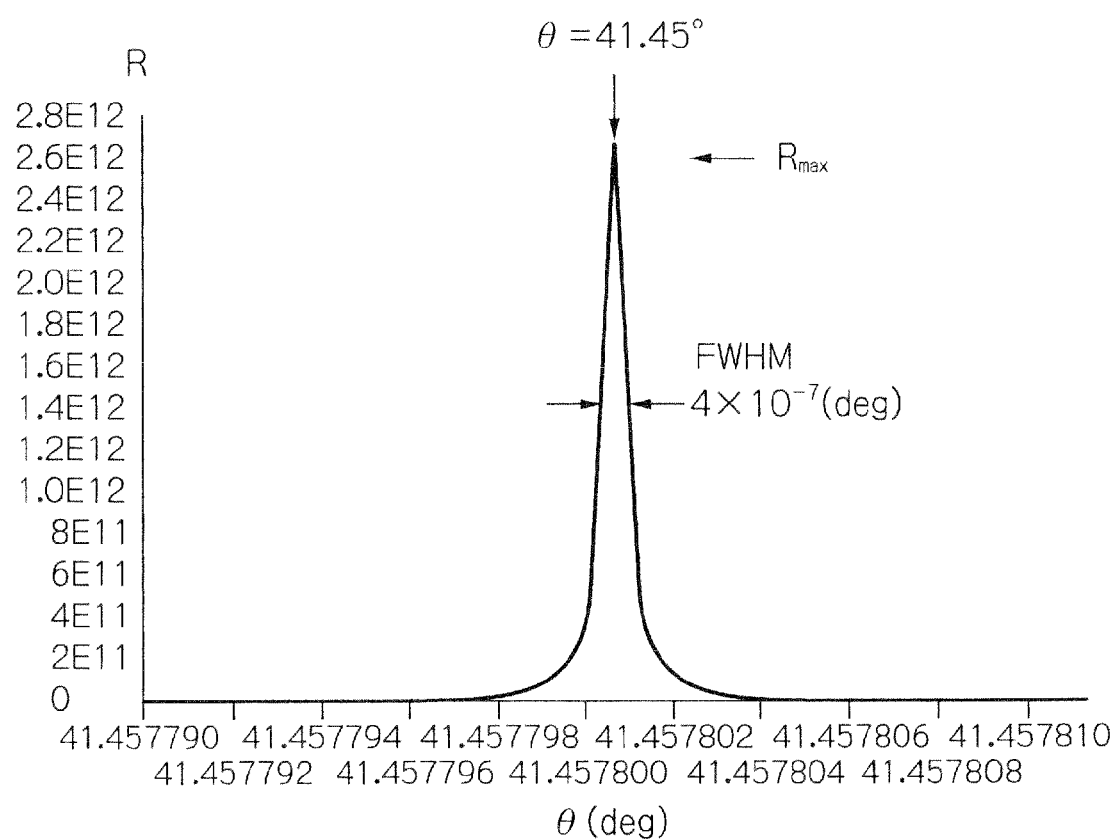
FIG. 13 is an enlargement of the reflection spectrum of FIG. 12.

As illustrated in FIG. 13, which is an enlargement of the reflection spectrum of FIG. 12, this reflection spectrum is an extremely-sharp δ-function. That is, when the thickness $t_{3a}$ of the GaAs layer 3a is 10 nm and the plasmon dip angle $\theta$ is 41.5°, actually, 41.45°, and the extinction coefficient $k_{3a}$ of the GaAs layer 3a is −0.64587, the output light (reflective light) intensity $I_{out}$ at the incident/reflective surface S1 of the Au layer 2 is about $10^{12}$ times the incident light intensity $I_{in}$. Therefore, ($\theta$, $t_{3a}$, $k_{3a}$)=(41.5°, 10 nm, −0.64587) is determined.

Figure 14A:
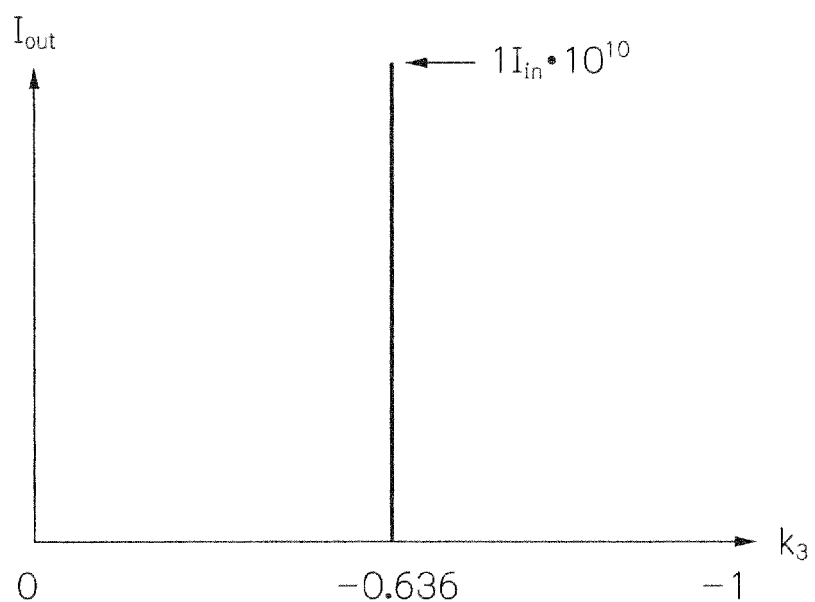
FIGS. 14A and 14B are graphs for illustrating a relationship between the extinction coefficient of the GaAs layer and the intensity of the output optical pulse signal of FIG. 9.
Figure 14B:
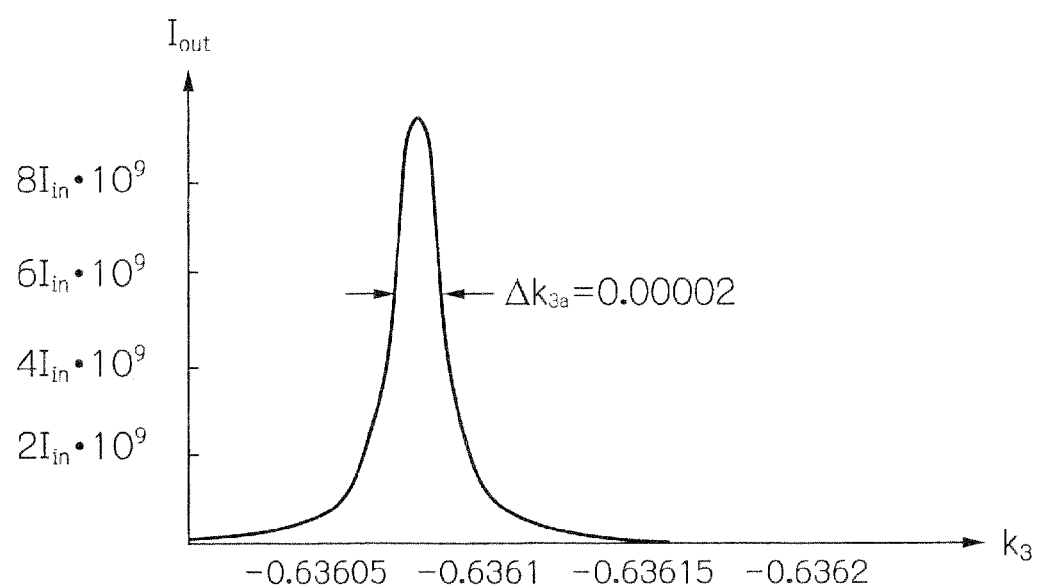

On the other hand, the extinction coefficient $k_{3a}$ of the GaAs layer 3a can be changed in accordance with the excitation intensity I of the GaAs layer 3a, i.e., $k_{3a}=\eta_2 I$. Therefore, since the optical pulse signal $P_7$ of the optical pulse generating unit 7 can be changed on a time basis, the extinction coefficient $k_{3a}$ of the GaAs layer 3a can be changed from 0 to 1.0, as illustrated in FIG. 14A and FIG. 14B which is an enlargement of FIG. 14A in the proximity of $k_{3a}$=−0.636. As a result, only when $k_{3a}$=−0.636, can a reflective pulse, i.e., an output optical pulse signal $P_1$ having a very large output light intensity $I_{out}$ can generated.

In FIG. 14B, note that an FWHM $\Delta k_{3a}$ of the extinction coefficient $k_{3a}$ is 0.00002.

Figure 15A:
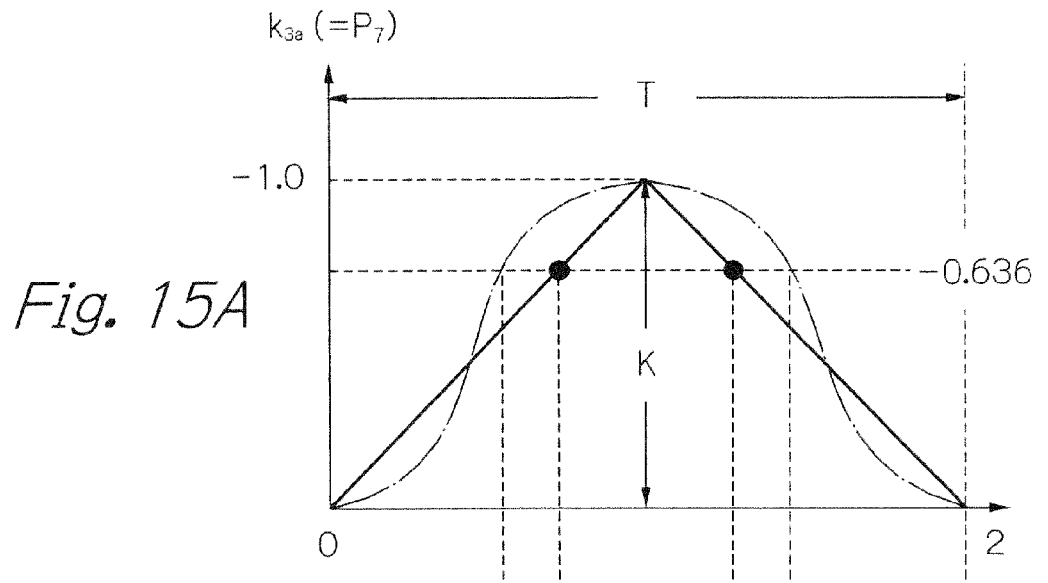
FIGS. 15A and 15B are timing diagrams of the extinction coefficient of the GaAs layer and the intensity of the output optical pulse signal, respectively, of FIG. 9.

As illustrated in FIG. 15A, it is assumed that the intensity of the optical pulse signal $P_7$ of the optical pulse generating unit 7 is triangular-pulsed so that the extinction coefficient $k_{3a}$ of the GaAs layer 3a is changed from 0 to −1.0 and from −1.0 to 0 where a time period T is 2ns and a change amount K of $k_{3a}$ is 1.0. In this case, an FWHM $\Delta t$ of the output optical pulse signal $P_1$ is calculated as follows:

$$K: T/2 = \Delta k_{3a}: \Delta t$$

$$\therefore \Delta t = \Delta k_{3a} \cdot (T/2)/K$$
$$= 0.00002 \cdot 1 \text{ ns}/1.0$$
$$= 0.0002 \text{ ns}$$
$$= 20 \text{ fs}$$

Figure 15B:
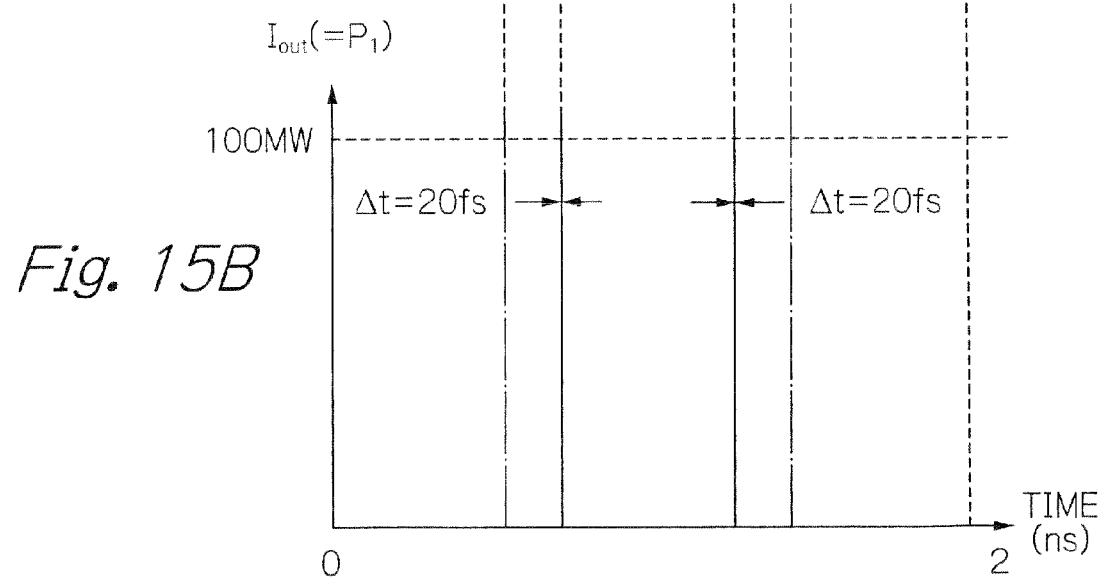

That is, when the optical pulse signal $P_7$ of as illustrated in FIG. 15A is used, the output optical pulse signal $P_1$ as illustrated in FIG. 15B is obtained. In this case, if the intensity $I_{in}$ of the incident light of the infrared laser source 5a is 10 mW, the output optical pulse signal $P_1$ has a peak output light intensity $I_{out}$ of about 100 MW which is about $10^{10}$ times the incident light intensity $I_{in}$.

Also, in FIG. 15A, the optical pulse signal $P_7$ of the optical pulse generating unit 7 is triangular-pulsed; however, the optical pulse signal $P_7$ is not limited to a triangular-pulsed wave. For example, the optical pulse signal $P_7$ can be hyperbolic secant-pulsed as indicated by a dotted solid line in FIG. 15A. In this case, the peak output light intensity $I_{out}$ is indicated by a dotted solid line in FIG. 15B.

As stated above, the above-mentioned value $10^{12}$ of the ratio of the output light (reflective light) intensity $I_{out}$ to the incident light intensity $I_{in}$ is not maximum. Note that this value corresponds to an oscillation state and, therefore, is theoretically indefinite. However, as the output light (reflective light) intensity $I_{out}$ is increased, the non-linear loss such as the induced scattering is increased, so that the output light (reflective light) intensity $I_{out}$, i.e., the above-mentioned ratio is not indefinite.

Also, the output, light has a small beam divergence angle. Generally, a very long resonator structure is needed to obtain such a small beam divergence angle. However, the resonator structure of the optical pulse generating apparatus of FIG. 9 is only 100 nm long.

Figure 16:
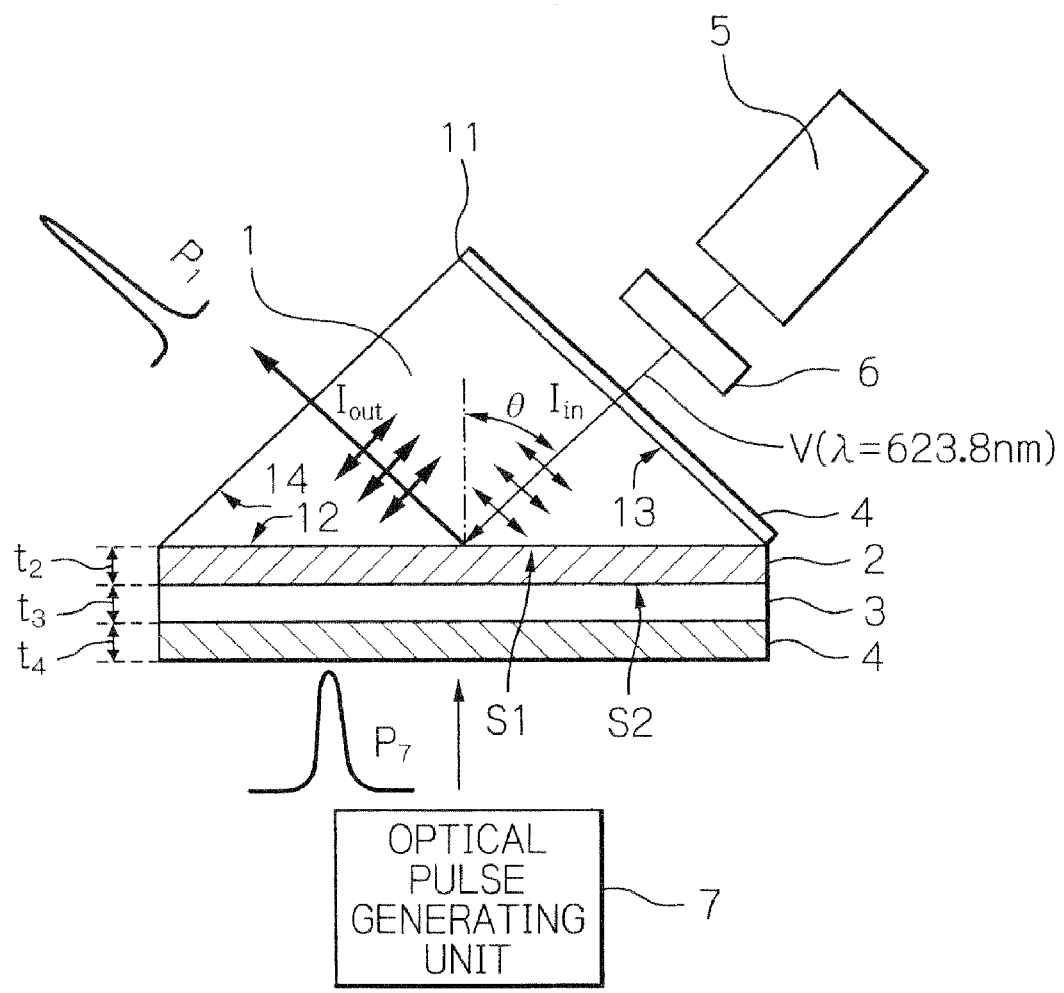
FIG. 16 is a cross-sectional view illustrating a third embodiment of the optical pulse generating apparatus according to the present invention.

In FIG. 16, which illustrates a third embodiment of the optical pulse generating apparatus according to the present invention, a silver (Ag) layer 4 serving as a resonator layer is added to the elements of the optical pulse generating apparatus of FIG. 1. In this case, the Ag layer 4 is deposited on the surface of the organic dye layer 3 opposing the surface S2 of the Au layer 2.

In FIG. 16, it is assumed that the organic dye layer 3 is excited by an additional pumping ultraviolet laser ray having a wavelength $\lambda$ of 320 nm. In this case, the Ag layer 4 has a high reflectivity to the visible laser ray V ($\lambda$=623.8 nm), while the Ag layer 4 has a low reflectivity or a high transmittance to the additional pumping ultraviolet laser ray ($\lambda$=320 nm). Therefore, the Ag layer 4 has a selective reflectivity, so that the Ag layer 4 can serve as a resonator layer.

The operational principle of the optical pulse generating apparatus of FIG. 16 is that the visible laser ray V is incident to the Au layer 2, and a part of the visible laser ray V transmitted via the organic dye layer 3 to the Ag layer 4 is reflected by the Ag layer 4. On the other hand, the organic dye layer 3 is excited by the ultraviolet laser ray transmitted from the Ag layer 4. As a result, evanescent photons are generated in the Au layer 2 by the visible laser ray V incident thereto and reflected from the Ag layer 4 to excite photons on the surface S2 of the Au layer 2. In this case, since the visible laser ray V is P-polarized, the visible laser ray V has an electric field component in parallel with the surface of the Au layer 2 and another electric field perpendicular to the surface of the Au layer 2, so that the respective electric fields are amplified. For example, the intensity of the electric field of a light incident to the Au layer 2 is made to be about twenty times by the SPR photons generated therein. Therefore, since the intensity of the light incident to the Au layer 2 is represented by a square value of the electric field, the light incident to the Au layer 2 is amplified by about 400 (=20×20) times.

Even in the optical pulse generating apparatus of FIG. 16, since the wavelength λ of the visible laser ray V of the He—Ne laser source 5 is 632.8 nm and the wavelength of SPK photons of Au is about 600 to 1000 nm, the SPR photons would be excited.

Figure 17:
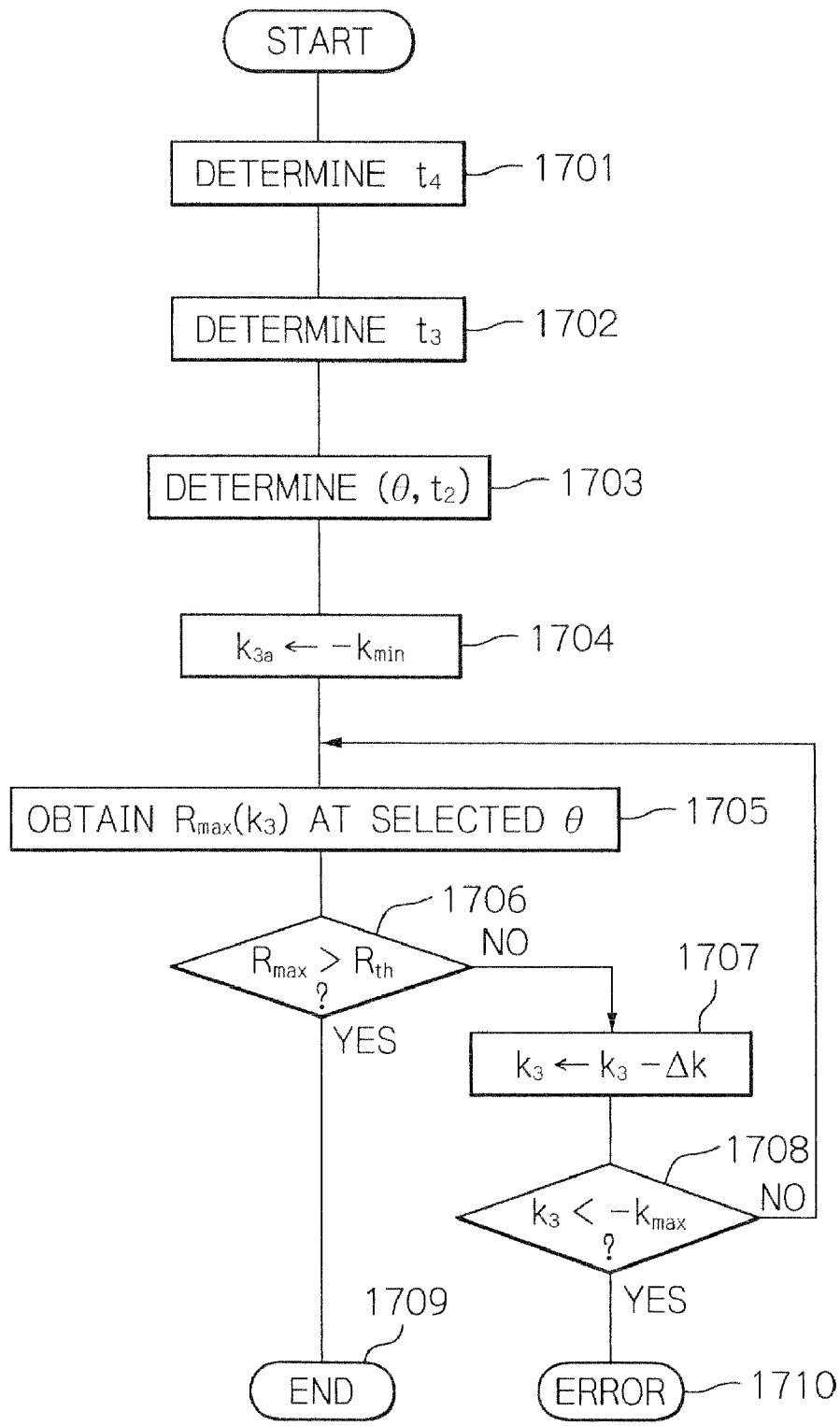
FIG. 17 is a flowchart for explaining a method for manufacturing the optical pulse generating apparatus of FIG. 16.

FIG. 17 is a flowchart for explaining a method for manufacturing the optical pulse generating apparatus of FIG. 16.

First, at step 1701, the thickness $t_4$ of the Ag layer 4 is determined, so that the transmittivity of the Ag layer 4 to the ultraviolet laser ray (λ=320 nm) is a predetermined value such as about 70 to 80%. For example, the thickness $t_4$ of the Ag layer 4 is determined to be 10 nm to realize the above-mentioned transmittivity.

Next, at step 1702, the thickness $t_3$ of the organic dye layer 3 is determined. For example, the thickness $t_3$ of the organic dye layer 3 is determined to be 50 nm in view of the above described first embodiment. That is, since the organic dye layer 3 has no absorption loss ($k_3$=0), when the thickness $t_3$ of the organic dye layer 3 is increased, the plasmon dip angle is shifted toward a higher angle where the depth of the plasmon dip is at a point of R=0, so that SPR photon scan be excited regardless of the thickness $t_3$ of the non-excited organic dye layer 3. However, the plasmon dip angle should be smaller than 90°. Note that, if $t_3$=200 nm, the plasmon dip angle is beyond 90°.

Next, at step 1703, (θ, $t_2$) where θ is an optimum incident angle and $t_2$ is the thickness of the Au layer 2 is determined. That is, if the incident angle θ of the visible laser ray V at the incident/reflective surface S1 of the Au layer 2 is an optimum incident angle $\theta_{opt}$ (>$\theta_c$ where $\theta_c$ is a critical angle), the number of SPR photons excited on the surface S2 of the Au layer 2 of FIG. 16 is maximum. In other words, when θ=$\theta_{opt}$>$\theta_c$, the reflectivity R at the incident/reflective surface S1 of the Au layer 2 is minimum. In this case, FIG. 18 was obtained by a simulation which calculates a reflectivity R of light reflected from the incident/reflective surface S1 of the Au layer 2 by angularly scanning the BK-7 prism 1 with the visible laser ray V. This simulation can be carried out by the above-mentioned simulation software WinSpall (trademark). From FIG. 18, (θ, $t_2$)=(46.5°, 39 nm) is determined.

Figure 18:
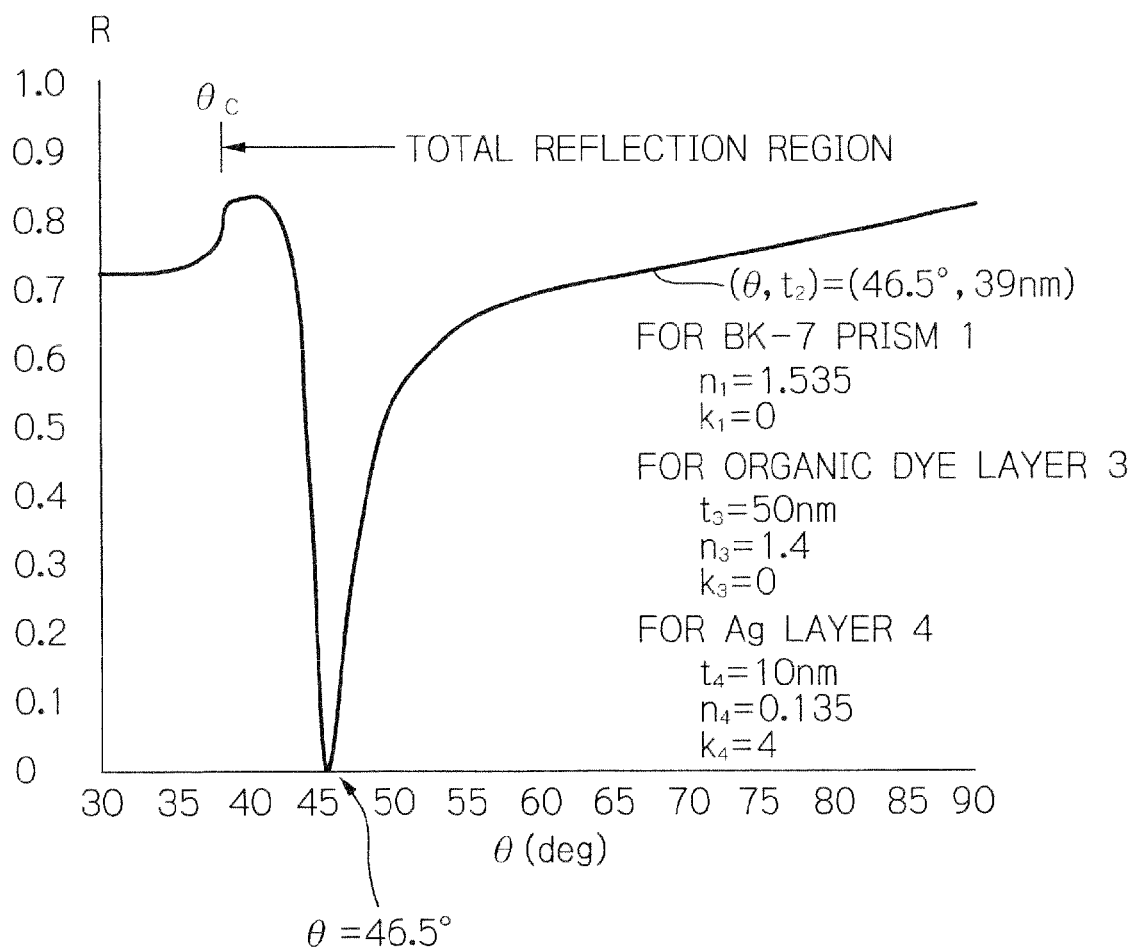
FIG. 18 is an ATR signal spectrum diagram for explaining (the incident angle, the thickness of the Au layer) at step 1703 of FIG. 17.

In FIG. 18, the simulation conditions are as follows:
1) The wavelength λ of the visible laser ray V is 632.8 nm.
2) For the BK-7 prism 1,
the refractive index $n_1$ is 1.535; and
the extinction coefficient $k_1$ is 0.
3) For the Au layer 2,
the refractive index $n_2$ is 0.18;
the extinction coefficient $k_2$ is 3; and
the thickness $t_2$ is variable.
4) For the organic dye layer 3,
the refractive index $n_3$ is 1.4;
the extinction coefficient $k_3$ is 0; and
the thickness $t_3$ is 50 nm.

Next, at steps 1704 to 1710, the extinction coefficient $k_3$ of the organic dye layer 3 is determined so as to obtain a desired reflectivity $R_{max}$ at the incident/reflective surface S1 of the Au layer 2. Even in this case, the extinction coefficient $k_3$ of the organic dye layer 3 is defined by the intensity of its population inversion state which can be realized by irradiating the organic dye layer 3 with an additional pumping laser ray or injecting a current into the organic dye layer 3. That is, the extinction coefficient $k_3$ of tho organic dye layer 3 is defined by $$k_3 = \eta_3 \cdot I$$

where I is the energy of the pumping laser ray or the injected current; and
$\eta_3$ is a constant. In the resonator structure of FIG. 16, $\eta_1$ is larger than $\eta_1$ and $\eta_2$.

Steps 1705 to 1710 will be explained below in detail.

At step 1705, the extinction coefficient $k_3$ of the organic dye layer 3 is initialized at $-k_{min}$ where $k_{min}$ is a positive value such as 0.001.

Next, at step 1706, a reflectivity $R_{max}$ at the selected incident angle θ is obtained. For example, an ATR signal spectrum (θ, $t_3$, $k_3$) using the above-mentioned simulation software WinSpall (trademark) is calculated, and the reflectivity $R_{max}$ at the selected incident angle θ is obtained from this ATR signal spectrum. In this case, the reflectivity $R_{max}$ at the selected incident angle θ can be obtained by directly observing the reflectivity $R_{ma}$.

Next, at step 1707, it is determined whether or not $R_{max}$>$R_{th}$ where $R_{th}$ is a predetermined value such as 6E4 is satisfied. As a result, only when $R_{max}$>$R_{th}$, does the flow proceed to step 1709 which completes the flowchart of FIG. 17. On the other hand, when $R_{max}$≦$R_{th}$, the flow proceeds to steps 1707 and 1708 which renew the extinction coefficient $k_3$ by decreasing the extinction coefficient $k_3$ by Δk such as 0.001, thus repeating the flow at steps 1705 and 1706. In this case, the extinction coefficient $k_3$ is guarded by step 1708. That is, when $k_3$≧$-k_{max}$ where $k_{max}$ is a definite value such as 1.0, the flow proceeds from step 1708 to steps 1705 and 1706. Otherwise, the flow proceeds from step 1708 to step 1710, which indicates an error.

Thus, the extinction coefficient $k_3$ of the organic dye layer 3 is changed from $k_{min}$ to $k_{max}$, the extinction coefficient $k_3$ is determined at the time when the reflectivity $R_{max}$ reaches $R_{th}$.

For example, when $k_2$=0.211 is obtained at step 1707, an ATR signal spectrum as illustrated in FIG. 17 is obtained. In this case, the reflectivity $R_{max}$ at the selected incident angle θ (=46.5°) is large, i.e., $R_{max}$>$R_{th}$, so that the flow proceeds to step 1709.

Thus, $k_3$=−0.211 is finally determined.

In FIGS. 18 and 19, note that the simulation conditions are as follows:
1) The wavelength λ of the visible laser ray V is 632.8 nm.
2) For the BK-7 prism 1,
the refractive index $n_1$ is 1.535; and
the extinction coefficient $k_1$ is 0.
3) For the Au layer 2,
the refractive index $n_2$ is 0.18;
the extinction coefficient $k_2$ is 3; and
the thickness $t_2$ is 39 nm.
4) For the organic dye layer 3,
the refractive index $n_3$ is 1.4.

Thus, under the presence of the Ag layer 4 serving as a resonator layer, the extinction coefficient $k_3$ of the organic dye layer 3 can be easily changed from 0 to −0.4 (negative value) in accordance with the excitation intensity of the organic dye layer 3.

As illustrated in FIG. 19, when the extinction coefficient $k_3$ of the organic dye layer 3 at the plasmon dip angle θ=46.5° (actually, 46.3°) of FIG. 18 is −0.211, the output light (reflective light) intensity $I_{out}$ at the incident/reflective surface S1 of the Au layer 2 is about $10^6$ times the incident light intensity $I_{in}$.

Figure 20A:
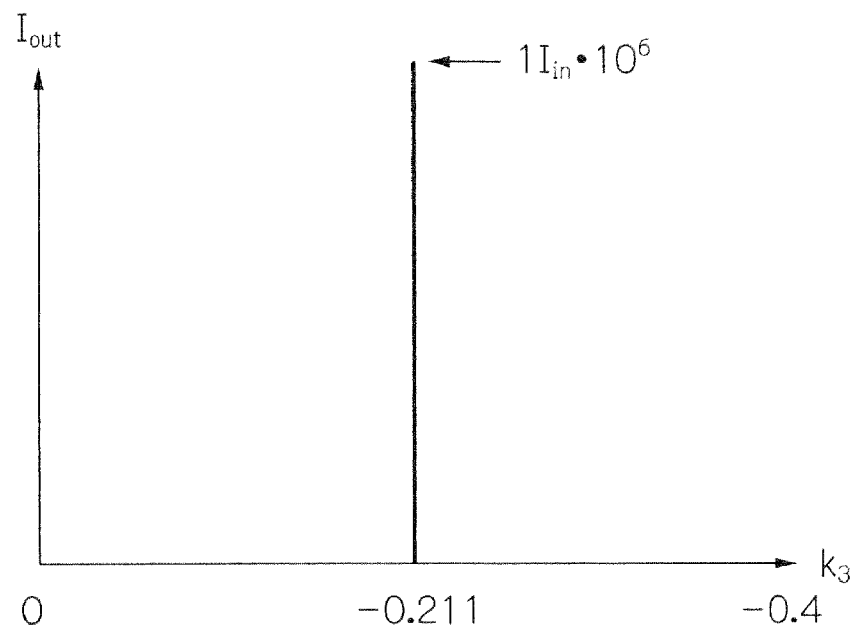
FIGS. 20A and 20B are graphs for illustrating a relationship between the extinction coefficient of the GaAs layer and the intensity of the output optical pulse signal of FIG. 16.
Figure 20B:
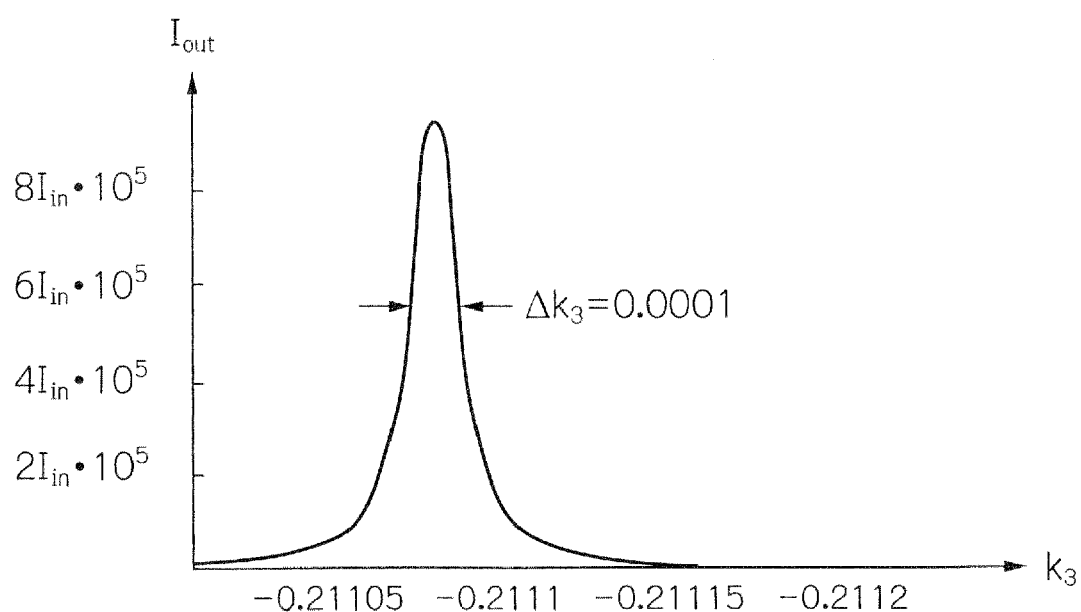

On the other hand, the extinction coefficient $k_3$ of the organic dye layer 3 can be changed in accordance with the excitation intensity I of the organic dye layer 3, i.e., $k_3=\eta_3 I$. Therefore, since the optical pulse signal $P_7$ of the optical pulse generating unit 7 can be changed on a time basis, the extinction coefficient $k_3$ of the organic dye layer 3 can be changed from 0 to −0.4, as illustrated in FIG. 20A and FIG. 20B which is an enlargement of FIG. 20A in the proximity of $k_3=-0.211$. As a result, only when $k_3=-0.211$, can a reflective pulse, i.e., an output optical pulse signal $P_1$ having a very large output light intensity $I_{out}$ be generated.

In FIG. 20B, note that an FWHM $\Delta k_3$ of the extinction coefficient $k_3$ is 0.0001.

Figure 21A:
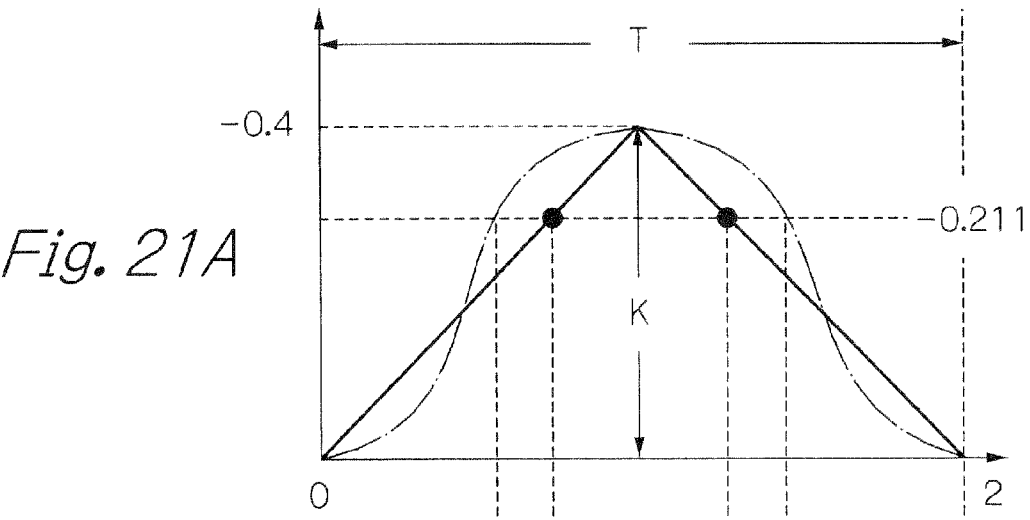
FIGS. 21A and 21B are timing diagrams of the extinction coefficient of the GaAs layer and the intensity of the output optical pulse signal, respectively, of FIG. 16.

As illustrated in FIG. 21A, it is assumed that the intensity of the optical pulse signal $P_7$ of the optical pulse generating unit 7 is triangular-pulsed so that the extinction coefficient $k_3$ of the organic dye layer 3 is changed from 0 to −0.4 and from −0.4 to 0 where a time period T is 2 ns and a change amount K of $k_3$ is 0.4. In this case, an FWHM $\Delta t$ of the output optical pulse signal $P_1$ is calculated as follows:

$$K: T/2 = \Delta k_3 : \Delta t$$

$$\therefore \Delta t = \Delta k_3 \cdot (T/2)/K$$
$$= 0.0001 \cdot 1 \text{ ns}/0.4$$
$$= 0.00025 \text{ ns}$$
$$= 250 \text{ fs}$$

Figure 21B:
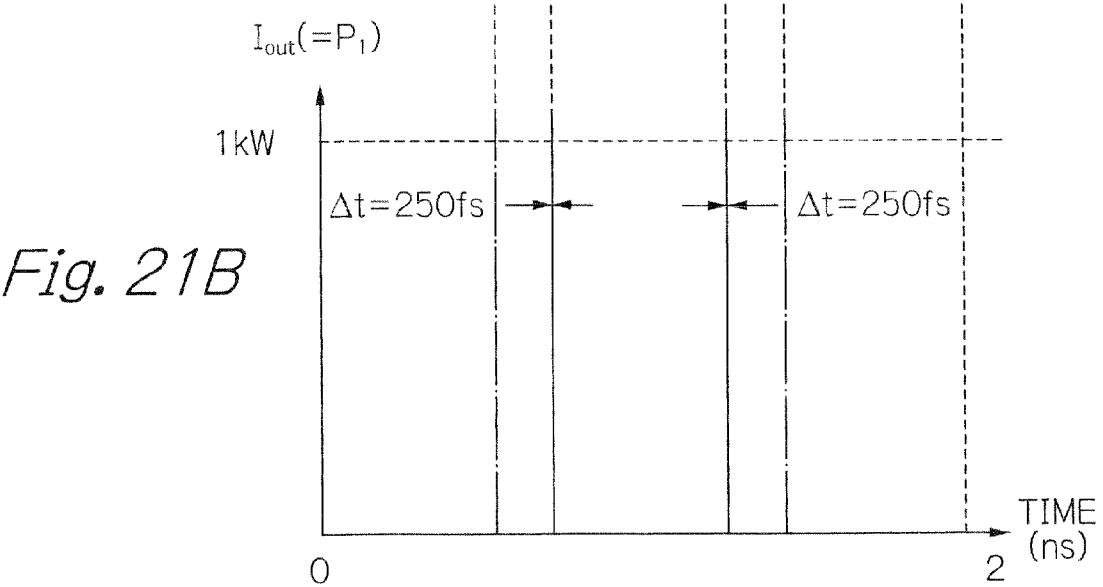

That is, when the optical pulse signal $P_7$ as illustrated in FIG. 21A is used, the output optical pulse signal $P_1$ as illustrated in FIG. 21B is obtained. In this case, if the intensity $I_{in}$ of the incident light of the He—Ne laser source 5 is 10 mW, the output optical pulse signal $P_1$ has a peak output light intensity $I_{out}$ of about 10 kW which is about $10^6$ times the incident light intensity $I_{in}$.

Even in FIG. 21A, the optical pulse signal $P_7$ of the optical pulse generating unit 7 is triangular-pulsed; however, the optical pulse signal $P_7$ is not limited to a triangular-pulsed wave. For example, the optical pulse signal $P_7$ can be hyperbolic secant-pulsed as indicated by a dotted solid line in FIG. 21A. In this case, the peak output light intensity $I_{out}$ is indicated by a dotted solid line in FIG. 21B.

Note that, instead of the Ag layer 4, a dielectric multi-layer mirror structure such as $SiO_2/TiO_2$ having a selective reflectivity can be used as a resonator layer.

Figure 22:
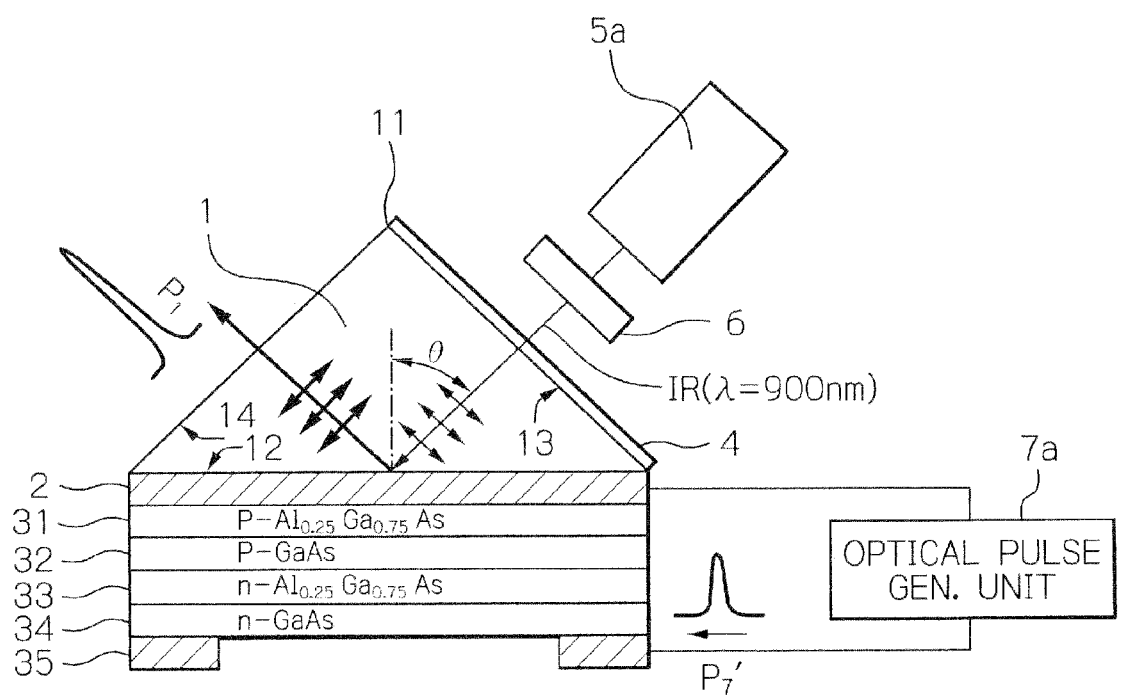
FIG. 22 is a cross-sectional view illustrating a third embodiment of the optical pulse generating apparatus according to the present invention.

In FIG. 22, which illustrates a fourth embodiment of the optical pulse generating apparatus according to the present invention, the GaAs layer 3a of FIG. 9 is replaced by a semiconductor laser element formed by a p-type $Al_{0.25}Ga_{0.75}As$ hole injection layer 31, a p-type GaAs active layer 32, an n-type $Al_{0.25}Ga_{0.75}As$ electron injection layer 33, an n-type GaAs substrate 34 and an Au electrode 35. Also, the optical pulse generating unit 7 of FIG. 9 is replaced by a current pulse generating unit 7a for generating a current pulse signal $P_7'$. The current pulse generating unit 7a is connected between the Au layer 5 and the electrode 35 to inject the current pulse signal $P_7'$ into the active layer 32. Note that the current pulse generating unit 7a is formed by a triangular current generating circuit which is relatively low in manufacturing cost.

In the Au layer 2, SPR photons are excited by incident light, and, in the active layer 32, a population inversion state is realized by the excitation due to the irradiation of the current pulse signal $P_7'$ (pumping current) of the current pulse generating unit 7a. Therefore, the extinction coefficient $k_{32}$ of the active layer 32 is made negative. As a result, the output light (reflective light) intensity $I_{out}$ at the incident/reflective surface S1 of the Au layer 2 is about $10^5$ times the incident light intensity $I_{in}$ in accordance with the negative extinction coefficient $k_{32}$ of the active layer 32. This is considered a resonance state between the SPR photons and the excitation state or population inversion state of the active layer 32.

The operational principle of the optical pulse generating apparatus of FIG. 22 is the same as that of the optical pulse generating apparatus of FIG. 1.

Figure 23:
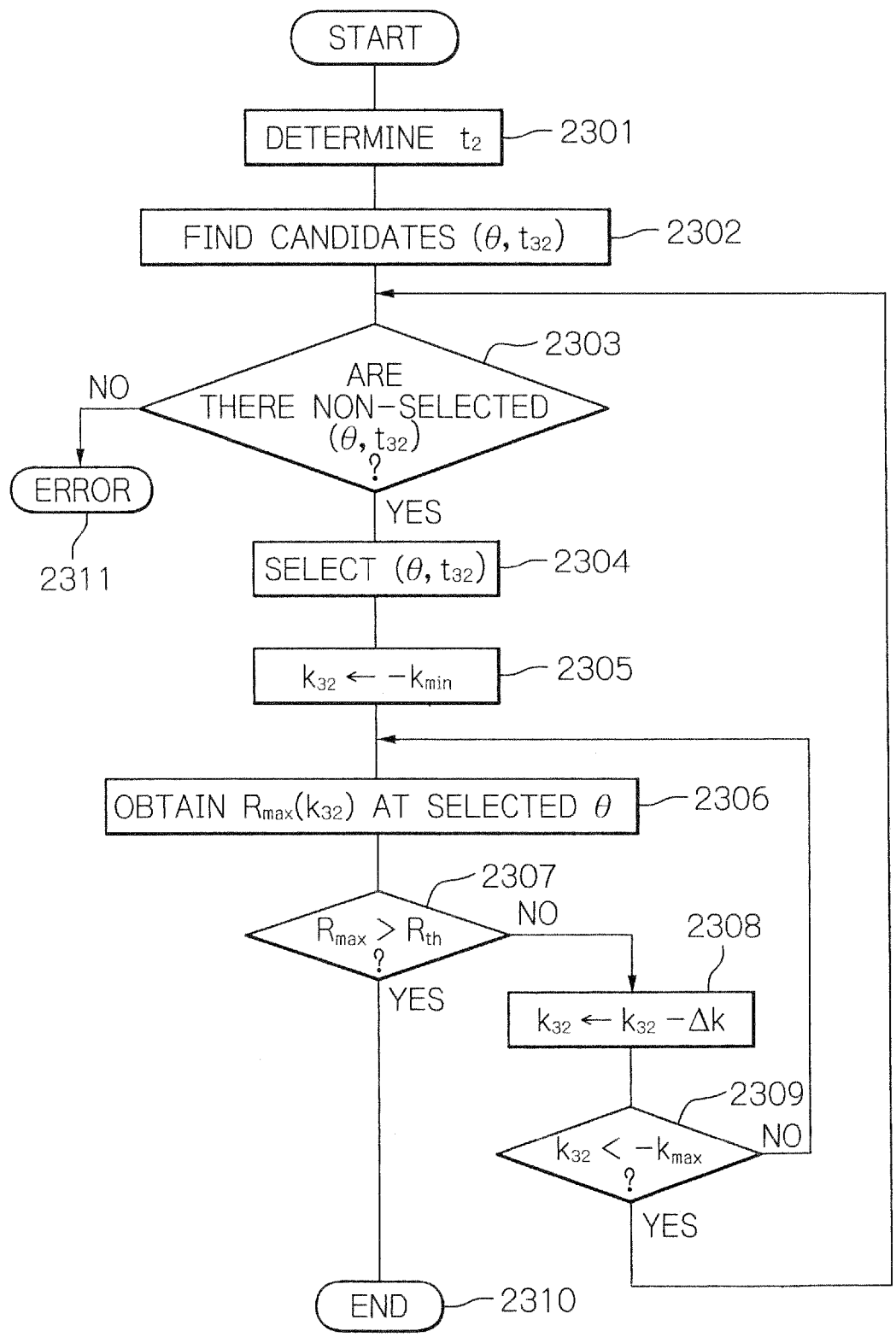
FIG. 23 is a flowchart for explaining a method for manufacturing the optical pulse generating apparatus of FIG. 22.

FIG. 23 is a flowchart for explaining a method for manufacturing the optical pulse generating apparatus of FIG. 22. Note that, in order to simplify the description, the hole injection layer 31, the electron injection layer 33 and the GaAs substrate 34 are assumed to be 50 nm, 50 nm and 950 nm thick, respectively, and only the thickness $t_{32}$ of the active layer 32 is considered at step 2302 of FIG. 23.

First, at step 2301, an optimum thickness $t_2$ of the Au layer 2 is determined. That is, if the incident angle θ of the infrared laser ray IR at the incident/reflective surface S1 of the Au layer 2 is an optimum incident angle $\theta_{opt}$ (>$\theta_c$ where $\theta_c$ is a critical angle), the number of SPR photons excited on the surface S2 of the Au layer 2 of FIG. 22 is maximum. In other words, when $\theta=\theta_{opt}>\theta_c$, the reflectivity R at the incident/reflective surface S1 of the Au layer 2 is minimum. In this case, an ATR signal spectrum (not shown) was obtained by a simulation which calculates a reflectivity R of light reflected from the incident/reflective surface S1 of the Au layer 2 by angularly scanning the BK-7 prism 1 with the infrared laser ray IR. This simulation can be carried out by the simulation software WinSpall (trademark) developed by Max Planck Institute.

In this case, the simulation conditions are as follows:
1) The wavelength λ of the infrared laser ray IR is 900 nm.
2) For the BK-7 prism 1,
the refractive index $n_1$ is 1.535; and
the extinction coefficient $k_1$ is 0.
3) For the Au layer 2,
the refractive index $n_2$ is 0.22;
the extinction coefficient $k_2$ is 6; and
the thickness $t_2$ is variable.
4) For the active layer 32,
the thickness $t_{32}$ is 0.

That is, the active layer 32 is assumed to be absent. Also, the hole injection layer 31, the electron injection layer 33, the GaAs substrate 34 and the electrode 35 are assumed to be absent.

As a result, the ATR signal spectrum at $t_2=39$ nm shows a sharp plasmon dip where the reflectivity R is 0. Therefore, the thickness $t_2$ of the Au layer 2 is determined to be 39±1 nm, so that the excited SPR photons are maximum.

Figure 24:
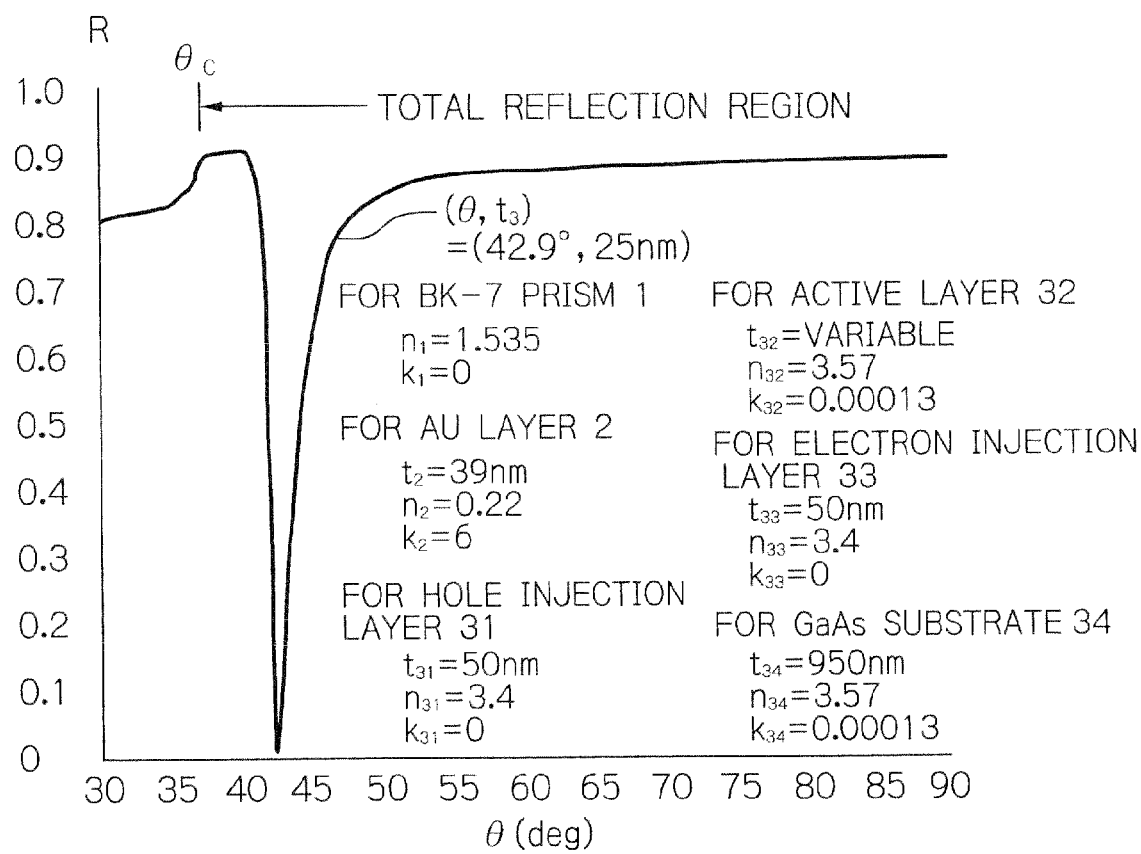
FIG. 24 is an ATR signal spectrum diagram for explaining (the incident angle, the thickness of the Au layer) at step 2303 of FIG. 23.

Next, at step 2302, candidates (θ, $t_{32}$) where θ is the incident angle and $t_{32}$ is the thickness of the active layer 32 are found. This step is carried out under the condition that the active layer 32 is in a non-excited state ($k_{32}=0$). FIG. 24 was obtained by a simulation using the above-mentioned simulation software WinSpall (trademark) which calculates a reflectivity R of light reflected from the incident/reflective surface S1 of the Au layer 2 by angularly scanning the BK-7 prism 1 with the infrared laser ray IR where the thickness $t_2$ of the Au layer 2 is fixed at 39 nm while the thickness $t_{32}$ of the active layer 32 is changed from 0 to 50 nm. In order to simplify the description, only one ATR signal spectrum at $t_{32}=25$ nm is illustrated in FIG. 24.

In FIG. 24, the simulation conditions are as follows:
1) The wavelength λ of the infrared laser ray IR is 900 nm.
2) For the BK-7 prism 1,
the refractive index $n_1$ is 1.535; and
the extinction coefficient $k_1$ is 0.
3) For the Au layer 2,
the thickness $t_2$ is 39 nm;
the refractive index $n_2$ is 0.22; and
the extinction coefficient $k_2$ is 6.
4) For the hole injection layer 31,
the thickness $t_{31}$ is 50 nm;
the refractive index $n_{31}$ is 3.4; and
the extinction coefficient $k_{31}$ is 0.
5) For the active layer 32,
the thickness $t_{32}$ is variable;
the refractive index $n_{32}$ is 3.57; and
the extinction coefficient $k_{32}$ is 0.00013.
6) For the electron injection layer 33,
the thickness $t_{33}$ is 50 nm;
the refractive index $n_{33}$ is 3.4; and
the extinction coefficient $k_{33}$ is 0.
7) For the GaAs substrate 34,
the thickness $t_{33}$ is 950 nm;
the refractive index $n_{32}$ is 3.57; and
the extinction coefficient $k_{32}$ is 0.00013.

Note that the extinction coefficients $k_{31}$ and $k_{33}$ of the hole injection layer 31 and the electron injection layer 33 are 0, so that no absorption theoretically occurs therein; however, the hole injection layer 31 and the electron injection layer 33 have a little absorption loss. Therefore, the thicknesses of the hole injection layer 31 and the electron injection layer 33 are relatively small, i.e., 50 nm.

As shown in FIG. 24, since the active layer 32 and the GaAs substrate 34 have a little absorption loss ($k_3$=0.00013), when the thickness $t_{32}$ of the active layer 32 is 25 nm, a sharp plasmon dip is observed at a point of R=0. In order to simplify the description, it is assumed that only the following one candidate (θ, $t_{32}$) is found:

$$(\theta, t_{32}) = (43.0°, 25 \text{ nm})$$

If at least one candidate (θ, $t_{32}$) is found, the flow proceeds from step 2303 to step 2304 which selects one candidate (θ, $t_{32}$). Otherwise, the flow proceeds from step 2303 to step 2311 which indicates an error.

That is, step 2303 determines whether there are still non-selected candidates among the candidates (θ, $t_{32}$) found at step 2302. If there is at least one non-selected candidate (θ, $t_{32}$), the flow proceeds to step 2304 which selects one candidate (θ, $t_{32}$) from the non-selected candidates, and then, steps 2305 through 2309 determine the extinction coefficient $k_{32}$ of the active layer 32, i.e., determines (θ, $t_{32}$, $k_{32}$).

Note that the extinction coefficient $k_{32}$ of the active layer 32 is defined by the intensity of its population inversion state which can be realized by exciting the active layer 32 with injecting a definite current into the active layer 32, instead of using the current pulse signal $P_7'$ of the current pulse generating unit 7a. That is, the extinction coefficient $k_{32}$ of the active layer 32 is defined by $$k_{32} = \eta_4 \cdot I$$

where I is the energy of the injected current; and
$\eta_4$ is a constant.

At step 2305, the extinction coefficient $k_{32}$ of the active layer 32 is initialized at $-k_{min}$ where $k_{min}$ is a positive value such as 0.001.

Next, at step 2306, a reflectivity $R_{max}$ at the selected incident angle θ is obtained. For example, an ATR signal spectrum (θ, $t_{32}$, $k_{32}$) using the above-mentioned simulation software WinSpall (trademark) is calculated, and the reflectivity $R_{max}$ at the selected incident angle θ is obtained from this ATR signal spectrum. In this case, the reflectivity $R_{max}$ at the selected incident angle θ can be obtained by directly observing the reflectivity $R_{max}$.

Next, at step 2307, it is determined whether or not $R_{max} > R_{th}$ where $R_{th}$ is a predetermined value such as 6E4 is satisfied. As a result, only when $R_{max} > R_{th}$, does the flow proceed to step 2310 which completes the flowchart of FIG. 23. On the other hand, when $R_{max} \leq R_{th}$, the flow proceeds to steps 2308 and 2309 which renew the extinction coefficient $k_{32}$ by decreasing the extinction coefficient $k_{32}$ by Δk such as 0.001, thus repeating the flow at steps 2306 and 2307. In this case, the extinction coefficient $k_{32}$ is guarded by step 2309. That is, when $k_{32} \geq -k_{max}$ where $k_{max}$ is a definite value such as 1.0, the flow proceeds from step 2309 to steps 2306 and 2307. Otherwise, the flow proceeds from step 2309 to step 2308.

Thus, when the extinction coefficient $k_{32}$ of the active layer 32 is changed from $k_{min}$ to $k_{max}$, the extinction coefficient $k_{32}$ is determined at the time when the reflectivity R reaches $R_{th}$.

Note that, when it is determined that there is no non-selected candidate (θ, $t_{32}$) at step 2303, the flow proceeds to step 2311, which means it is impossible to determine the extinction coefficient $k_{32}$ of the active layer 32.

Figure 25:
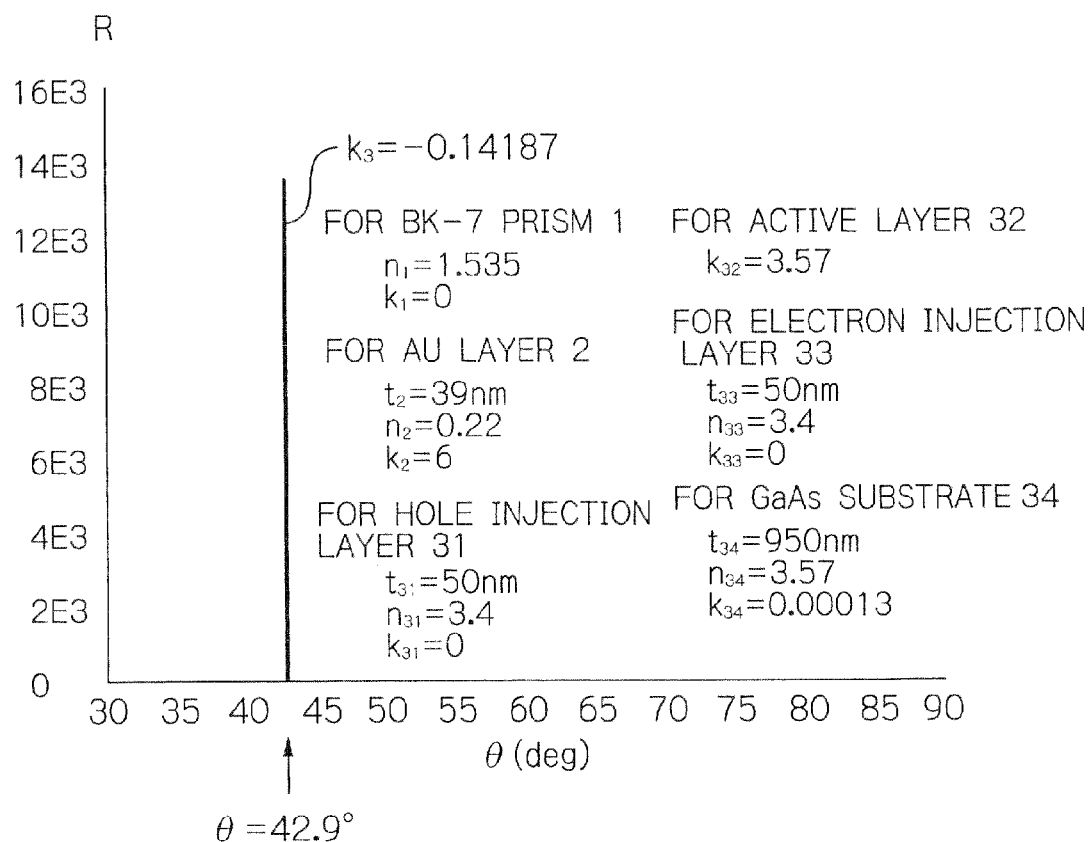
FIG. 25 is an ATR signal spectrum diagram for explaining the reflectivity at the selected incident angle at step 2305 of FIG. 23.

For example, when (θ, $t_{32}$)=(43.0°, 25 nm) is selected at step 2304 and $k_{32}$=−0.147187 is obtained at step 2308, an ATR signal spectrum as illustrated in FIG. 25 is obtained. In this case, the reflectivity $R_{max}$ at the selected incident angle θ (=43.0°) is large, so that the flow proceeds via to step 2310.

Thus, (θ, $t_{32}$, $k_{32}$)=(43.0°, 25 nm, −0.147187) is finally determined.

In FIG. 25, note that the simulation conditions are as follows:
1) The wavelength λ of the infrared laser ray IR is 900 nm.
2) For the BK-7 prism 1,
the refractive index $n_1$ is 1.535; and
the extinction coefficient $k_1$ is 0.
3) For the Au layer 2,
the refractive index $n_2$ is 0.22;
the extinction coefficient $k_2$ is 6; and
the thickness $t_2$ is 39 nm.
4) For the hole injection layer 31,
the thickness $t_{31}$ is 50 nm;
the refractive index $n_{31}$ is 3.4; and
the extinction coefficient $k_{31}$ is 0.
5) For the active layer 32,
the thickness $t_{32}$ is 25 nm;
the refractive index $n_{32}$ is 3.57; and
the extinction coefficient $k_{32}$ is −0.147187.
6) For the electron injection layer 33,
the thickness $t_{33}$ is 50 nm;
the refractive index $n_{33}$ is 3.4; and
the extinction coefficient $k_{33}$ is 0.
7) For the GaAs substrate 34,
the thickness $t_{32}$ is 950 nm;
the refractive index $n_{32}$ is 3.57; and
the extinction coefficient $k_{32}$ is 0.00013.

As illustrated in FIG. 25, this reflection spectrum is an extremely-sharp δ-function. That is, when the thickness $t_{32}$ of the active layer 32 is 25 nm and the plasmon dip angle θ is 42.9°, and the extinction coefficient $k_{32}$ of the active layer 32 is −0.147187, the output light (reflective light) intensity $I_{out}$ at the incident/reflective surface S1 of the Au layer 2 is about $10^4$ times the incident light intensity $I_{in}$. Therefore, (θ, $t_{32}$, $k_{32}$)= (12.9°, 25 nm, −0.147187) is determined.

Figure 26A:
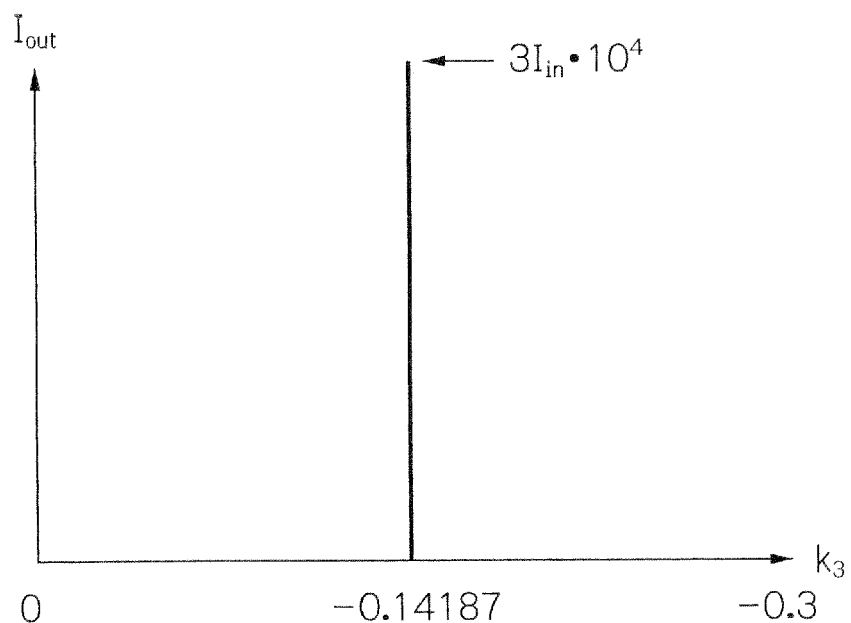
FIGS. 26A and 26B are graphs for illustrating a relationship between the extinction coefficient of the active layer and the intensity of the output optical pulse signal of FIG. 22.
Figure 26B:
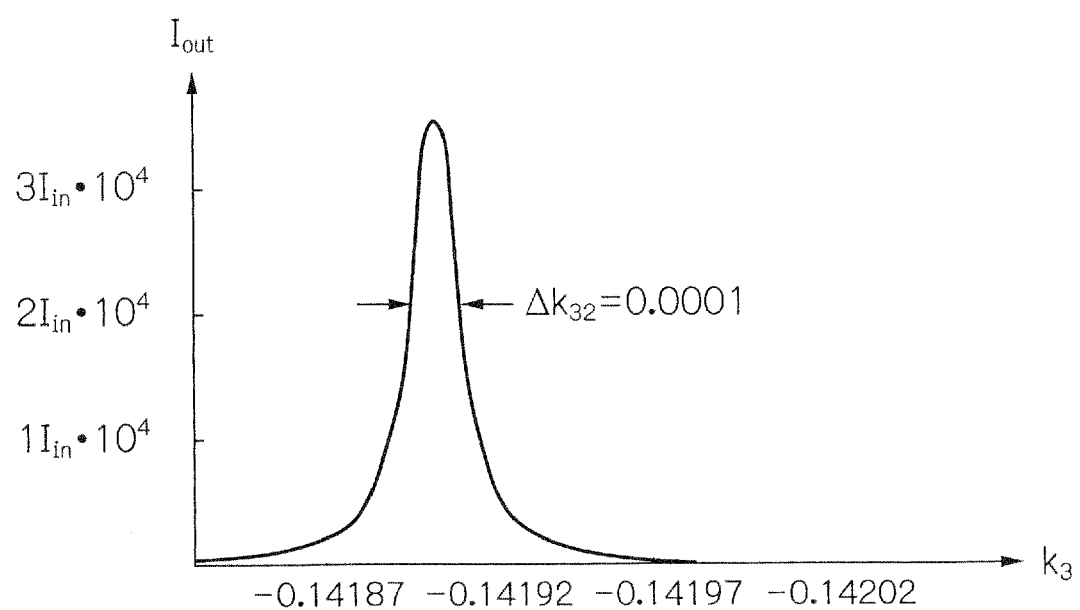

On the other hand, the extinction coefficient $k_{32}$ of the active layer 32 can be changed in accordance with the excitation intensity I of the active layer 32, i.e., $k_{32}=\eta_4 I$. Therefore, since the current pulse signal $P_7'$ of the current pulse generating unit 7a can be changed on a time basis, the extinction coefficient $k_{32}$ of the active layer 32 can be changed from 0 to 0.3, as illustrated in FIG. 26A and FIG. 26B which is an enlargement of FIG. 26A in the proximity of $k_{32}=-0.147187$. As a result, only when $k_{32}=-0.147187$, can a reflective pulse, i.e., an output optical pulse signal $P_1$ having a very large output light intensity $I_{out}$ be generated.

In FIG. 26B, note that an FWHM $\Delta k_{32}$ of the extinction coefficient $k_{32}$ is 0.00001.

Figure 27A:
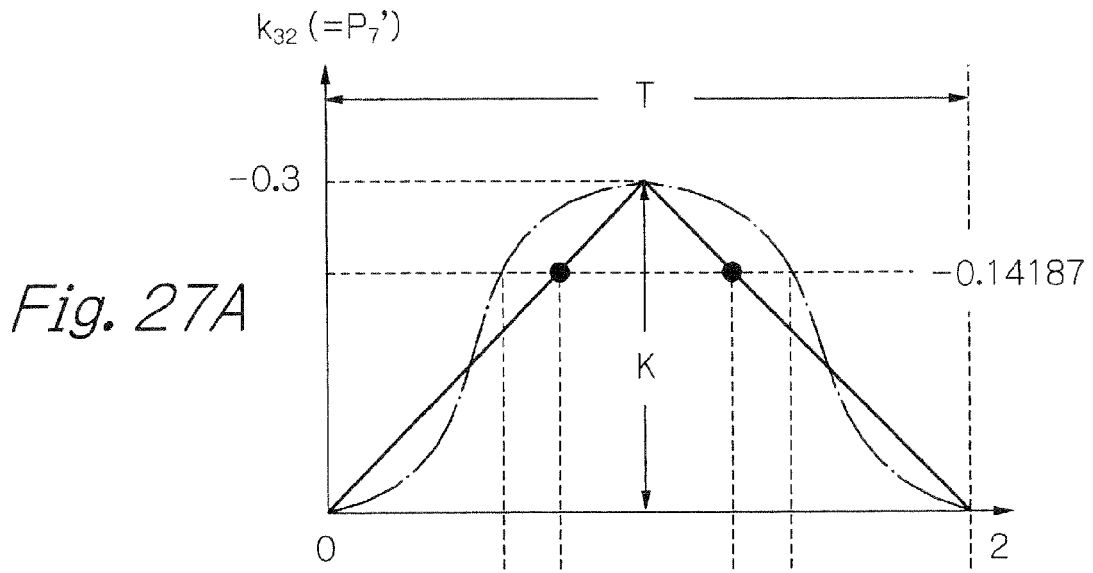
FIGS. 27A and 27B are timing diagrams of the extinction coefficient of the active layer and the intensity of the output optical pulse signal, respectively, of FIG. 22.

As illustrated in FIG. 27A, it is assumed that the intensity of the current pulse signal $P_7'$ of the current pulse generating unit 7a is triangular-pulsed so that the extinction coefficient $k_{32}$ of the active layer 32 is changed from 0 to −0.3 and from −0.3 to 0 where a time period T is 2 ns and a change amount K of $k_{32}$ is 0.3. In this case, an FWHM $\Delta t$ of the output optical pulse signal $P_1$ is calculated as follows:

$$K: T/2 = \Delta k_{32}: \Delta t$$
$$\therefore \Delta t = \Delta k_{32} \cdot (T/2)/K$$
$$= 0.0001 \cdot 1 \text{ ns}/0.3$$
$$= 0.00033 \text{ ns}$$
$$= 330 \text{ fs}$$

Figure 27B:
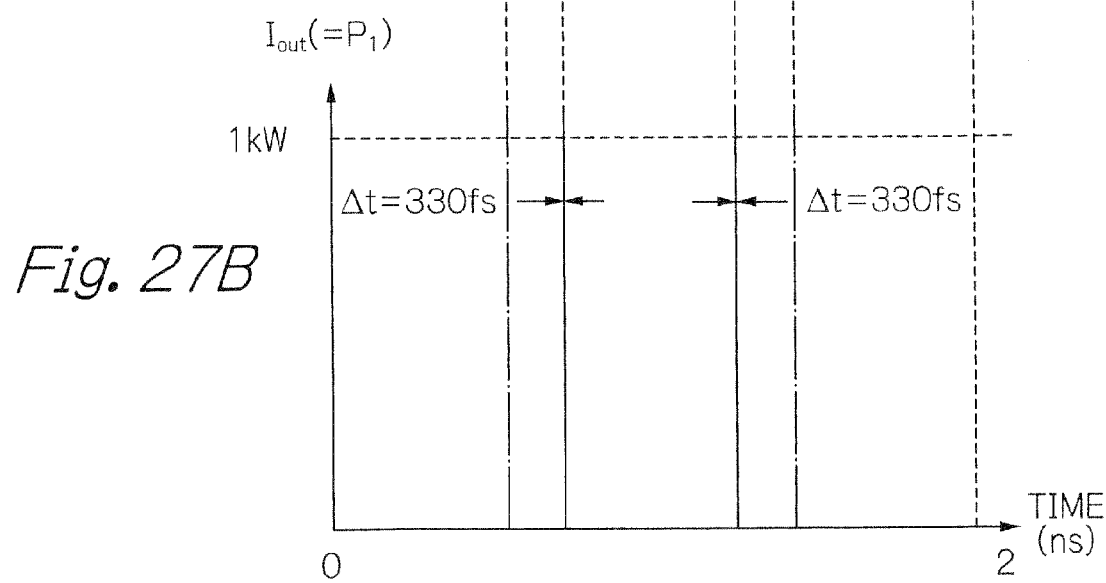

That is, when the current pulse signal $P_7'$ of as illustrated in FIG. 27A is used, the output optical pulse signal $P_1$ as illustrated in FIG. 27B is obtained. In this case, if the intensity $I_{in}$ of the incident light of the infrared laser source 5a is 10 mW, the output optical pulse signal $P_1$ has a peak output light intensity $I_{out}$ of about 1 kW which is about $10^5$ times the incident light intensity $I_{in}$.

Also, in FIG. 27A, the current pulse signal $P_7'$ of the current pulse generating unit 7a is triangular-pulsed; however, the current, pulse signal $P_7'$ is not limited to a triangular-pulsed wave. For example, the current pulse signal $P_7'$ can be sinusoidal-pulsed as indicated by a dotted solid line in FIG. 27A. In this case, the peak output light intensity $I_{out}$ is indicated by a dotted solid line in FIG. 27B.

The manufacturing process of the optical pulse generating apparatus of FIG. 22 is explained below.

First, an about 50 nm thick n-type $Al_{0.25}G_{0.75}As$ electron injection layer 33 ($n_{33}=3.4$, $k_{33}=0$), an about 25 nm thick p-type GaAs active layer 32 ($n_{32}=3.57$, $k_{32}=0.00013$) and an about 50 nm thick p-type $Al_{0.25}Ga_{0.75}As$ hole injection layer 31 ($n_{31}=3.4$, $k_{31}=0$) are sequentially-grown by a metal organic chemical vapor deposition (MOCVD) process on an about 300 to 500 μm thick n-type GaAs substrate 34 ($n_{34}=3.57$, $k_{34}=0.00013$). In this case, the n-type layers are doped with n-type impurities such as Si, while the p-type layers are doped with p-type impurities such as Zn, in order to adjust their conductivities thereof.

Next, an about 20 nm thick Au layer is deposited by an evaporating processor the like on the hole injection layer 31. In this case, a metal layer made of such as Ti or Pt is evaporated on the hole injection layer 31 in advance, in order to improve the contact characteristics between the hole injection layer 31 and the Au layer.

On the other hand, an about 30 nm thick Au layer is also deposited on a surface 12 of a BK-7 prism 1.

Next, the Au layer of the prism 1 and the Au layer of the GaAs substrate 34 are adhered by using a metal diffusion process. As a result, the Au layer of the prism 1 and the Au layer of the GaAs substrate 34 are completely pressed so that an Au layer 2 having a reduced thickness of about 39 nm is produced.

Next, the GaAs substrate 34 is thinned by a chemical/mechanical polishing (CMF) process or the like, so that the GaAs substrate 34 has a reduced thickness of about 950 nm, which would enhance the optical amplification by SPR photons and the generation of optical pulses.

Finally, an Au electrode 35 is formed by an evaporating process or the like on an inner peripheral surface of the GaAs substrate 34. In this case, a metal layer made of such as Ge or Ni is formed on the back surface of the GaAs substrate 34 in advance, in order to improve the contact characteristics between the Au electrode 35 and the GaAs substrate 34.

Figure 28A:
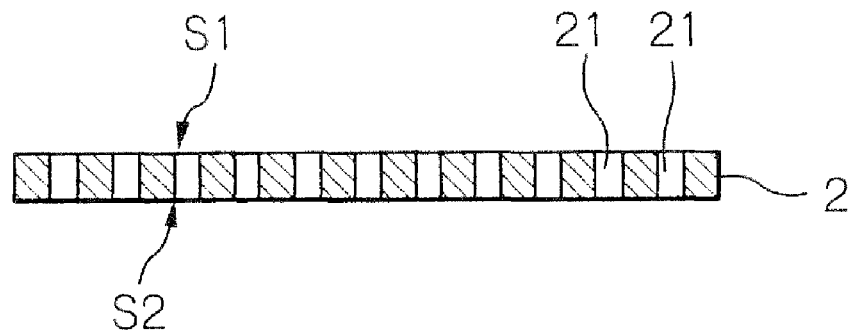
FIG. 28A is a cross-sectional view of a modification of the Au layer of FIGS. 1, 9, 16 and 22.

FIG. 28A is a cross-sectional view illustrating a modification of the Au layer 2 of FIGS. 1, 9, 16 and 22, and FIG. 28B is a plan view of the modification of FIG. 28A.

Figure 28B:
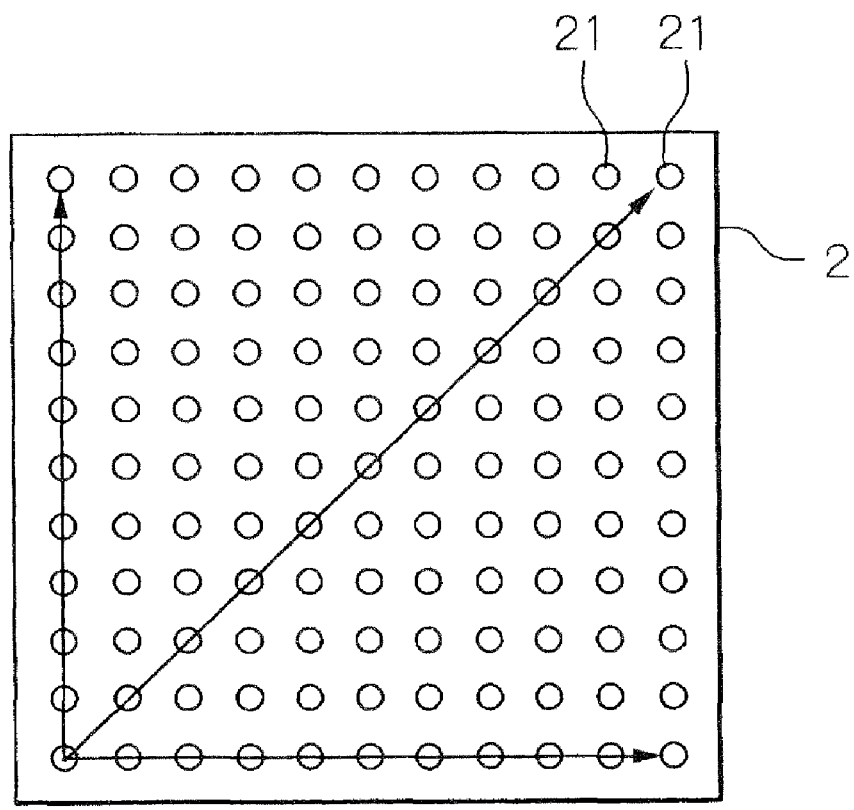
FIG. 28B is a plan view of the modification of FIG. 28A.

As illustrated in FIGS. 28A and 28B, holes 21 are regularly perforated in the Au layer 2. In this case, the holes 21 have a diameter smaller than the wavelength λ of the visible laser ray V (or the infrared laser ray IR). Therefore, when the visible laser ray V (or the infrared laser ray IR) is incident to the incident/reflective surface S1 of the Au layer 2, a part of the visible laser ray V (or the infrared laser ray IR) is incident into the holes 21, so that this part is hardly radiated from the holes 21 due to the small diameter thereof, while evanescent photons are generated in the Au layer 2. This phenomenon is known as means for generating evanescent photons using very small holes. Additionally, as indicated by arrows in FIG. 28B, evanescent photons generated in one of the holes 21 propagate into an adjacent one of the holes 21 to enhance the intensity of the evanescent photons. As a result, SPR photons are easily excited on the photoelectric surface S2 of the Au layer 2 by the enhanced evanescent photons.

In the above-described embodiments, since the Au layer 2 for generating SPR photons can serve as an electrode, a current injection into the dielectric layer can be easily carried out by using the Au layer 2 as such an electrode. Particularly, in the optical pulse generating apparatus of FIG. 16, the Au/dielectric layer/Ag resonator structure resembles a structure for injecting a current, into the dielectric layer.

Also, when the present invention is applied to an infrared light emitting device with a high population inversion state which has a high internal quantum efficiency and a low external quantum efficiency, an output light (reflective light) can be extracted from the device at an efficiency of about 100%.

Note that the above-mentioned flowcharts of FIGS. 2, 10, 17 and 23 can be stored in a read-only memory (ROM) or another nonvolatile memory or in a random access memory (RAM) or another volatile memory.

The invention claimed is:

1. An optical pulse generating apparatus, comprising:
  a metal layer having an incident/reflective surface adapted to receive incident light and output its reflective light as an optical pulse signal;
  a dielectric layer formed on an opposite surface of said metal layer opposing said incident/reflective surface; and
  a dielectric layer exciting unit adapted to excite said dielectric layer on a time basis,
  said incident light exciting surface plasmon resonance light in said metal layer while said dielectric layer is excited on a time basis so that an extinction coefficient of said dielectric layer is made negative.

2. The optical pulse generating apparatus as set forth in claim 1, wherein said dielectric layer exciting unit comprises an optical pulse generating unit adapted to generate another optical pulse signal whose pulse width is larger than a pulse width of said optical pulse signal, said dielectric layer being irradiated with said other optical pulse signal.

3. The optical pulse generating apparatus asset forth in claim 2, wherein said other optical pulse signal is triangular-pulsed.

4. The optical pulse generating apparatus asset forth in claim 2, wherein said other optical pulse signal is a hyperbolic secant pulse signal.

5. The optical pulse generating apparatus as set forth in claim 1, wherein said dielectric layer exciting unit comprises a pulse current generating unit adapted to generate pulse current signal whose pulse width is larger than a pulse width of said optical pulse signal, said pulse current signal being injected into said dielectric layer.

6. The optical pulse generating apparatus as set forth in claim 5, wherein said pulse current signal is triangular-pulsed.

7. The optical pulse generating apparatus as set forth in claim 5, wherein said pulse current signal is sinusoidal-pulsed.

8. The optical pulse generating apparatus asset forth in claim 1, wherein an incident angle of said incident light to said metal layer is a light absorption dip angle by which a reflectivity of said incident light at said incident/reflective surface of said metal layer is minimum in a total reflection region while said dielectric layer is not excited.

9. The optical pulse generating apparatus asset forth in claim 1, wherein a thickness of said metal layer is determined so that the reflectivity of said incident light at said incident/reflective surface of said metal layer is minimum when said incident light is incident at said light absorption dip angle to said incident/reflective surface of said metal layer while said dielectric layer is not excited.

10. The optical pulse generating apparatus asset forth in claim 1, further comprising a transparent body attached to said incident/reflective surface of said metal layer.

11. The optical pulse generating apparatus as set forth in claim 10, wherein said transparent body comprises a prism.

12. The optical pulse generating apparatus as set forth in claim 11, wherein a surface of said prism on which said metal layer is formed opposes an arris of said prism.

13. The optical pulse generating apparatus as set forth in claim 11, wherein said prism has first and second surfaces forming an arris thereof, said optical pulse generating apparatus further comprising an anti-reflection coating layer formed on said first surface of said prism, said incident light being incident through said anti-reflection coating layer to said prism.

14. The optical pulse generating apparatus asset forth in claim 1, wherein said metal layer comprises one of an Au layer, an Ag layer, a Cu layer, a Al layer, a Ir layer, Mo layer, a Ni layer, a Pt layer, a Rh layer, a Ni layer, a Ti layer, a V layer, a Cr layer, a Mn layer, a Fe layer, a Co layer, a Nb layer, a Pd layer, and an alloy layer made of at least one of Au, Ag, Cu, Al, Ir, Mo, Ni, Pt, Rh, W, Ti, V, Cr, Mn, Fe, Co, Nb and Pd.

15. The optical pulse generating apparatus as set forth in claim 1, wherein said dielectric layer comprises an organic dye layer.

16. The optical pulse generating apparatus as set forth in claim 1, wherein said dielectric layer comprises a semiconductor layer.

17. The optical pulse generating apparatus as set forth in claim 1, further comprising a resonator layer deposited on an opposite surface of said dielectric layer opposing said metal layer.

18. The optical pulse generating apparatus as set forth in claim 17, wherein said resonator layer comprises a silver (Ag) layer.

19. The optical pulse generating apparatus as set forth in claim 17, wherein said resonator layer comprises a dielectric multi-layer mirror structure.

20. The optical pulse generating apparatus as set forth in claim 1, wherein a plurality of holes are perforated in said metal layer, a diameter of each of said holes being smaller than a wavelength of said incident light.

21. The optical pulse generating apparatus as set forth in claim 20, wherein said holes are regularly arranged in said metal layer.

22. A method for manufacturing an optical pulse generating apparatus, comprising:

a metal layer having an incident/reflective surface adapted to receive incident light and output its reflective light as an optical pulse signal;

a dielectric layer deposited on an opposite surface of said metal layer opposing said incident/reflective surface; and a dielectric layer exciting unit adapted to excite said dielectric layer on a time basis, said incident light exciting surface plasmon resonance light in said metal layer while said dielectric layer is excited on a time basis so that an extinction coefficient of said dielectric layer is made negative, said method comprising:

determining a thickness of said metal layer, so that the reflectivity of said incident light at said incident/reflective surface of said metal layer is minimum a total reflection region when said incident light is incident to said incident/reflective surface of said metal layer while said dielectric layer is not excited;

determining at least one candidate of an incident angle of said incident light to said metal layer and a thickness of said dielectric layer, so that the reflectivity of said incident light at said incident/reflective surface of said metal layer is minimum in said total reflection region while said determined thickness of said metal layer is maintained and said dielectric layer is not excited; and determining a thickness of said dielectric layer corresponding to an excited state of said dielectric layer, so that the reflectivity of said incident light at said incident angle of said candidate is beyond a predetermined value while said thickness of said dielectric layer of said candidate is maintained.

23. A method for manufacturing an optical pulse generating apparatus, comprising:

a metal layer having an incident/reflective surface adapted to receive incident light and output its reflective light as an optical pulse signal;

a dielectric layer deposited on an opposite surface of said metal layer opposing said incident/reflective surface;

a resonator layer deposited on an opposite surface of said dielectric layer opposing said metal layer; and a dielectric layer exciting unit adapted to excite said dielectric layer on a time basis, said incident light exciting surface plasmon resonance light in said metal layer while said dielectric layer is excited on a time basis so that an extinction coefficient of said dielectric layer is made negative, said method comprising:

determining a thickness of said resonator layer in accordance with a predetermined transmittivity of said resonator layer;

determining a thickness of said dielectric layer;

determining an incident angle of said incident light at said incident/reflective surface of said metal layer and a thickness of said metal layer, so that the reflectivity of said incident light at said incident/reflective surface of said metal layer is minimum in a total reflection region when said incident light is incident to said incident/reflective surface of said metal layer while said dielectric layer is not excited; and determining a thickness of said dielectric layer corresponding to an excited state of said dielectric layer, so that the reflectivity of said incident light at said incident angle is beyond a predetermined value while said incident angle of said incident light at said incident/reflective surface of said metal layer and said thickness of said dielectric layer are maintained.

* * * * *